(12) United States Patent
Chu

(10) Patent No.: US 6,345,330 B2
(45) Date of Patent: *Feb. 5, 2002

(54) COMMUNICATION CHANNEL AND INTERFACE DEVICES FOR BRIDGING COMPUTER INTERFACE BUSES

(75) Inventor: William W. Y. Chu, Los Altos, CA (US)

(73) Assignee: Acqis Technology, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,882

(22) Filed: Sep. 8, 1998

Related U.S. Application Data

(60) Provisional application No. 60/083,886, filed on May 1, 1998, and provisional application No. 60/092,706, filed on Jul. 14, 1998.

(51) Int. Cl.⁷ .......................... G06F 3/00; G06F 13/12; G06F 13/28; G06F 13/00
(52) U.S. Cl. .......................... 710/65; 710/29; 710/101
(58) Field of Search .......................... 375/244; 710/29, 710/62, 65, 70, 71, 101, 128, 129, 69, 106; 708/100

(56) References Cited

U.S. PATENT DOCUMENTS 4,700,362 A * 10/1987 Todd et al. .................. 375/249
4,890,282 A   12/1989 Lambert et al. .............. 370/79

(List continued on next page.)

FOREIGN PATENT DOCUMENTS

EP        0 722 138 A     7/1996
JP        06 289953 A    10/1994

(List continued on next page.)

OTHER PUBLICATIONS

Digital Semiconductor, 21152 PCI–to–PCI Bridge Product Brief (02/96).

(List continued on next page.)

Primary Examiner—Thomas Lee
Assistant Examiner—Chun Cao
(74) Attorney, Agent, or Firm—Townsend& Townsend&Crew LLP

(57) ABSTRACT

The present invention encompasses an apparatus for bridging a first computer interface bus and a second computer interface bus, where each of the first and second computer interface buses have a number of parallel multiplexed address/data bus lines and operate at a clock speed in a predetermined clock speed range having a minimum clock speed and a maximum clock speed. The apparatus comprises an interface channel having a clock line and a plurality of bit lines for transmitting bits; a first interface controller coupled to the first computer interface bus and to the interface channel to encode first control signals from the first computer interface bus into first control bits to be transmitted on the interface channel and to decode second control bits received from the interface channel into second control signals to be transmitted to the first computer interface bus; and a second interface controller coupled to the interface channel and the second computer interface bus to decode the first control bits from the interface channel into third control signals to be transmitted on the second computer interface bus and to encode fourth control signals from the second computer interface bus into the second control bits to be transmitted on the interface channel.

In one embodiment, the first and second interface controllers comprise a host interface controller (HIC) and a peripheral interface controller (PIC), respectively, the first and second computer interface buses comprise a primary PCI and a secondary PCI bus, respectively, and the interface channel comprises an LVDS channel.

15 Claims, 57 Drawing Sheets

U.S. PATENT DOCUMENTS

| | | | |
|---|---|---|---|
| 4,939,735 A | * 7/1990 | Fredericks et al. | 714/798 |
| 5,278,509 A | 1/1994 | Haynes et al. | |
| 5,278,730 A | 1/1994 | Kikinis | |
| 5,293,497 A | 3/1994 | Free | |
| 5,331,509 A | 7/1994 | Kikinis | |
| 5,355,391 A | 10/1994 | Horowitz et al. | |
| 5,463,742 A | 10/1995 | Kobayashi | 395/281 |
| 5,539,616 A | 7/1996 | Kikinis | |
| 5,550,710 A | 8/1996 | Rahamim et al. | 361/687 |
| 5,578,940 A | 11/1996 | Dillon et al. | |
| 5,600,800 A | 2/1997 | Kikinis et al. | |
| 5,606,717 A | 2/1997 | Farmwald et al. | |
| 5,640,302 A | 6/1997 | Kikinis | |
| 5,659,773 A | 8/1997 | Huynh et al. | |
| 5,663,661 A | 9/1997 | Dillon et al. | |
| 5,680,126 A | 10/1997 | Kikinis | |
| 5,721,837 A | 2/1998 | Kikinis et al. | 395/281 |
| 5,819,050 A | 10/1998 | Boehling et al. | 395/284 |
| 5,826,048 A | * 10/1998 | Dempsey et al. | 710/129 |
| 5,848,249 A | * 12/1998 | Garbus et al. | 710/128 |
| 5,859,669 A | * 1/1999 | Prentice | 348/469 |
| 5,907,566 A | * 5/1999 | Benson et al. | 714/798 |
| 5,948,047 A | 9/1999 | Jenkins et al. | 708/141 |
| 5,960,213 A | * 9/1999 | Wilson | 710/2 |
| 5,968,144 A | * 10/1999 | Walker et al. | 709/100 |
| 5,991,844 A | * 11/1999 | Khosrowpour | 710/129 |
| 5,999,952 A | 12/1999 | Jenkins et al. | 708/100 |
| 6,029,183 A | 2/2000 | Jenkins et al. | 708/100 |
| 6,040,792 A | * 3/2000 | Watson et al. | 341/100 |
| 6,052,513 A | * 4/2000 | MacLaren | 395/294 |
| 6,216,185 B1 | 4/2001 | Chu | 710/101 |

FOREIGN PATENT DOCUMENTS

| | | |
|---|---|---|
| WO | 92 18924 A | 10/1992 |
| WO | 94 00970 A | 1/1994 |
| WO | 95 13640 A | 5/1995 |

OTHER PUBLICATIONS

Intel Corporation, Intel 430TX PCISET: 82439TX System Controller (MTXC) Architectural Overview (02/97).

Intel Corporation, Intel 82371AB PCI–to–ISA/IDE XCEL-ERATOR (PIIX4) Architectural Overview (04/97).

Intel Corporation, Intel 440LX AGPSET: 82443LX PCI A.G.P. Controller (PAC) Advance Information (08/97).

National Semiconductor, DS90CR215/DS90CR216 General Description (07/97).

National Semiconductor, DS90CR215 Product Folder.

Video Electronics Standards Association (VESA), Plug and Display(P&D) Standard, P&D and Digital Transition Minimized Differential Signaling (TMDS) Video Transmission Overview, Version 1, Revision 0, pp. 1 & 31–34 (1997).

* cited by examiner

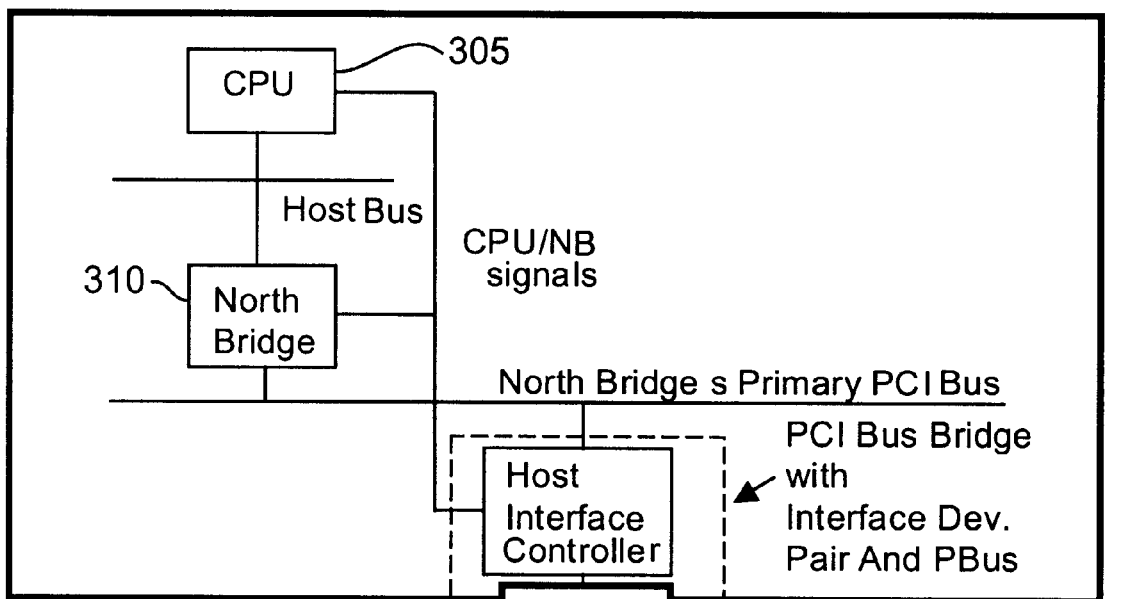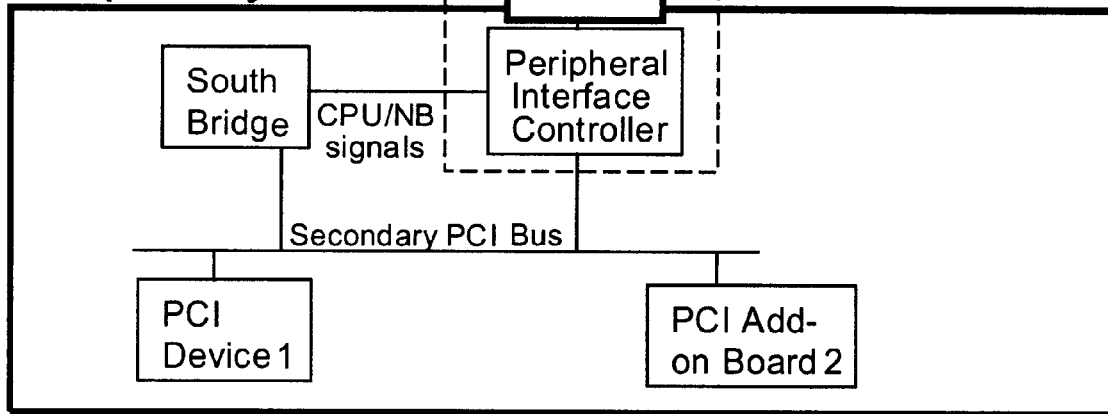
FIG. 3

HIC as Target (Default)

| Control Signal | HIC to XPBus | XPBus to HIC | Primary PCI Bus | Comment |
|---|---|---|---|---|
| FRAME # | Encode (BS0) | | Transaction Active | |
| IRDY # | Encode (BS1) | | Initiator Ready | |
| TRDY # | Local | | HIC Generates | |
| DEVSEL # | Local | | HIC Accepts Command | Positive decode, medium |
| STOP # | Local | | HIC requests to retry | Posted Read operation |
| PAR | Encode | Decode | Parity for A/C; D/BE | |
| IDSEL | Local | | Used locally for config. 0 | |
| PERR # | Encode | Decode | Data Parity Error | |
| SERR # | | Decode | Address/System Parity Error | |
| REQ # | | Decode | HIC requests to be master | S. Bus device requests bus |
| GNT # | Encode | | Host grants bus | |
| RST | | | | Independent signal |

FIG. 7

HIC as Master

| Control Signal | HIC to XPBus | XPBus to HIC | Primary PCI Bus | Comment |
|---|---|---|---|---|
| FRAME # | | Decode | Transaction Active | |
| IRDY # | | Decode | Initiator Ready | |
| TRDY # | Local | | Receive from Target | |
| DEVSEL # | Local | | Receive from Target | |
| STOP # | Local | | retry handles locally | |
| PAR | Encode | Decode | Parity for A/C; D/BE | |
| IDSEL | Local | | Used locally for config. 0 | |
| PERR # | Encode | Decode | Data Parity Error | |
| SERR # | | Decode | Address/System Parity Error | |
| REQ # | | Decode | HIC continue to be Master | PCI device can end REQ# |
| GNT # | Encode | | Arbiter grant bus to HIC | Arbiter can deassert GNT# |
| RST | | | | Independent signal |

FIG. 8

PIC as Target

| Control Signal | PIC to XPBus | XPBus to PIC | Secondary PCI Bus | Comment |
|---|---|---|---|---|
| FRAME # | Encode (BS0) | | Transaction Active | |
| IRDY # | Encode (BS1) | | Initiator Ready | |
| TRDY # | Local | | PIC Generates | |
| DEVSEL # | Local | | PIC Accepts Command | Positive decode, medium |
| STOP # | Local | Decode | PIC requests to retry | Host can stop trans. |
| PAR | Encode | Decode | Parity for A/C; D/BE | |
| IDSEL | Local | | Used locally for config. 0 | |
| PERR # | Encode | Decode | Data Parity Error | |
| SERR # | Encode | Decode | Address/System Parity Error | |
| REQ # | | | PIC requests to be master | P. Bus device requests bus |
| GNT # | Encode | | PIC grants bus to itself | |
| RST | | | | Independent signal |

FIG. 12

PIC as Master (Default)

| Control Signal | PIC to XPBus | XPBus to PIC | Secondary PCI Bus | Comment |
|---|---|---|---|---|
| FRAME # | | Decode | Transaction Active | |
| IRDY # | | Decode | Initiator Ready | |
| TRDY # | Local | | Receive from Target | |
| DEVSEL # | Local | | Receive from Target | |
| STOP # | Local/Encode | | Receive from Target | Target can stop trans. |
| PAR | Encode | Decode | Parity for A/C; D/BE | |
| IDSEL | Local | | Used locally for config. 0 | |
| PERR # | Encode | Decode | Data Parity Error | |
| SERR # | Encode | Decode | Address/System Parity Error | - |
| REQ # | | Decode | PIC request to be Master | |
| GNT # | Encode | | Arbiter grant bus to PIC | |
| RST | | | | Independent signal |

FIG. 13

ACM s XIS BUS Connector Plug PIN Position (88 pin):

| | | | | | | | |
|---|---|---|---|---|---|---|---|
| V23 | GND | GND | V1 | P23 | GND | GND | P1 |
| V24 | P&D D0 + | RED VIDEO | V2 | P24 | PD0 + | PDR0 + | P2 |
| V25 | P&D D0 - | GND | V3 | P25 | PD0 - | PDR0 - | P3 |
| V26 | GND | GREEN VIDEO | V4 | P26 | GND | GND | P4 |
| V27 | P&D CLK + | GND | V5 | P27 | PD1 + | PDR1 + | P5 |
| V28 | P&D CLK - | BLUE VIDEO | V6 | P28 | PD1 - | PDR1 - | P6 |
| V29 | GND | GND | V7 | P29 | GND | GND | P7 |
| V30 | P&D D1 + | HSYNC | V8 | P30 | PD2 + | PDR2 + | P8 |
| V31 | P&D D1 - | VSYNC | V9 | P31 | PD2 - | PDR2 - | P9 |
| V32 | GND | GND | V10 | P32 | GND | GND | P10 |
| V33 | P&D D2 + | DDC2: SCL | V11 | P33 | PCK + | PCKR + | P11 |
| V34 | P&D D2 - | DDC2: SDA | V12 | P34 | PCK - | PCKR - | P12 |
| V35 | Config 3 | Config 2 | V13 | P35 | Config 1 | Config 0 | P13 |
| V36 | GND | TV CV/CNTL0 | V14 | P36 | GND | GND | P14 |
| V37 | VPCK + | SV Y/CNTL1 | V15 | P37 | PD3 + | PDR3 + | P15 |
| V38 | VPCK - | SV C/CNTL2 | V16 | P38 | PD3 - | PDR3 - | P16 |
| V39 | GND | V33 | V17 | P39 | GND | GND | P17 |
| V40 | VPD + | V33 | V18 | P40 | PCN + | PCNR + | P18 |
| V41 | VPD - | V33 | V19 | P41 | PCN - | PCNR - | P19 |
| V42 | GND | V33 | V20 | P42 | Reserved | V5 | P20 |
| V43 | GND | V33 | V21 | P43 | Reserved | V5 | P21 |
| V44 | GND | V33 | V22 | P44 | Reserved | V5 | P22 |

FIG. 17

| Pin No. | Symbol | Signal | Standard | Description |
|---|---|---|---|---|
| P2 | PDR0 + | LVDS | | Peripheral data reverse 0 + |
| P3 | PDR0 - | LVDS | | Peripheral data reverse 0 - |
| P5 | PDR1 + | LVDS | | Peripheral data reverse 1 + |
| P6 | PDR1 - | LVDS | | Peripheral data reverse 1 - |
| P8 | PDR2 + | LVDS | | Peripheral data reverse 2 + |
| P9 | PDR2 - | LVDS | | Peripheral data reverse 2 - |
| P11 | PCKR + | LVDS | | Peripheral clock reverse + |
| P12 | PCKR - | LVDS | | Peripheral clock reverse - |
| P15 | PDR3 + | LVDS | | Peripheral data reverse 3 + |
| P16 | PDR3 - | LVDS | | Peripheral data reverse 3 - |
| P18 | PCNR + | LVDS | | Peripheral control reverse + |
| P19 | PCNR - | LVDS | | Peripheral control reverse - |
| P24 | PD0 + | LVDS | | Peripheral data 0 + |
| P25 | PD0 - | LVDS | | Peripheral data 0 - |
| P27 | PD1 + | LVDS | | Peripheral data 1 + |
| P28 | PD1 - | LVDS | | Peripheral data 1 - |
| P30 | PD2 + | LVDS | | Peripheral data 2 + |
| P31 | PD2 - | LVDS | | Peripheral data 2 - |
| P33 | PCK + | LVDS | | Peripheral clock + |
| P34 | PCK - | LVDS | | Peripheral clock - |
| P37 | PD3 + | LVDS | | Peripheral data 3 + |
| P38 | PD3 - | LVDS | | Peripheral data 3 - |
| P40 | PCN + | LVDS | | Peripheral control + |
| P41 | PCN - | LVDS | | Peripheral Control - |
| P13 | Config 0 | Static | 3.3v or GND | Configuration bit 0 |
| P35 | Config 1 | Static | 3.3v or GND | Configuration bit 1 |
| P1,P4,P7,P10, P14,P17,P23,P26, P29,P32,P36,P39 | GND | | GND | Ground |

FIG. 18

| Pin No. | Symbol | Signal | Standard | Description |
|---|---|---|---|---|
| V2 | Red Video | Analog | | Video |
| V4 | Green Video | Analog | | Video |
| V6 | Blue Video | Analog | | Video |
| V8 | HSYNC | | | Horizontal Sync |
| V9 | VSYNC | | | Vertical Sync |
| V11 | DDC2 SCL | | VESA DDC std 2 | DDC Clock |
| V12 | DDC2 SDA | | VESA DDC std 2 | DDC Data |
| V14 | TV-CV/CNTL 0 | | | TV Composite Video |
| V15 | SV Y/CNTL 1 | | Super Video | SV Luminance or Control 1 |
| V16 | SV C/CNTL 2 | | Super Video | SV Chrominance or Control 2 |
| V24 | D0 + | TMDS | VESA P & D | Data 0 + |
| V25 | D0 - | TMDS | VESA P & D | Data 0 - |
| V27 | CLK + | TMDS | VESA P & D | Clock + |
| V28 | CLK - | TMDS | VESA P & D | Clock - |
| V30 | D1 + | TMDS | VESA P & D | Data 1 + |
| V31 | D1 - | TMDS | VESA P & D | Data 1 - |
| V33 | D2 + | TMDS | VESA P & D | Data 2 + |
| V34 | D2 - | TMDS | VESA P & D | Data 2 - |
| V37 | VPCK + | LVDS | | Video Port Pixel Clock + |
| V38 | VPCK - | LVDS | | Video Port Pixel Clock - |
| V40 | VPD + | LVDS | | Video Port Pixel Data + |
| V41 | VPD - | LVDS | | Video Port Pixel Data - |
| V13 | Config 2 | | 3.3v or GND | Configuration bit 2 |
| V35 | Config 3 | | 3.3v or GND | Configuration bit 3 |
| V1,V3,V5,V7, V10,V23,V26, V29,V32,V36, V39,V42,V43, V44 | GND | | GND | Ground |

FIG. 19

|  | Symbol | Signal | Data Rate | Description |
|---|---|---|---|---|
| 1 | PD0 RTN | | | GND |
| 2 | PD0 + | Synch. To PCK | 10 x clock rate | Computer to Peripheral LVDS Data 0 + |
| 3 | PD0 - | | | Computer to Peripheral LVDS Data 0 - |
| 4 | PD1 RTN | | | GND |
| 5 | PD1 + | Synch. To PCK | 10 x clock rate | Computer to Peripheral LVDS Data 1 + |
| 6 | PD1 - | | | Computer to Peripheral LVDS Data 1 - |
| 7 | PD2 RTN | | | GND |
| 8 | PD2 + | Synch. To PCK | 10 x clock rate | Computer to Peripheral LVDS Data 2 + |
| 9 | PD2 - | | | Computer to Peripheral LVDS Data 2 - |
| 10 | PD3 RTN | | | GND |
| 11 | PD3 + | Synch. To PCK | 10 x clock rate | Computer to Peripheral LVDS Data 3 + |
| 12 | PD3 - | | | Computer to Peripheral LVDS Data 3 - |
| 13 | PCK RTN | | | GND |
| 14 | PCK + | Clock | Clock rate | Computer to Peripheral LVDS Clock + |
| 15 | PCK - | | | Computer to Peripheral LVDS Clock - |
| 16 | PCN RTN | | | GND |
| 17 | PCN + | Synch. To PCK | 10 x clock rate | Computer to Peripheral LVDS Control + |
| 18 | PCN - | | | Computer to Peripheral LVDS Control - |
| 19 | PDR0 RTN | | | GND |
| 20 | PDR0 + | Synch. To PCKR | 10 x clock rate | Peripheral to Computer LVDS Data 0 + |
| 21 | PDR0 - | | | Peripheral to Computer LVDS Data 0 - |
| 22 | PDR1 RTN | | | GND |
| 23 | PDR1 + | Synch. To PCKR | 10 x clock rate | Peripheral to Computer LVDS Data 1 + |
| 24 | PDR1 - | | | Peripheral to Computer LVDS Data 1 - |
| 25 | PDR2 RTN | | | GND |
| 26 | PDR2 + | Synch. To PCKR | 10 x clock rate | Peripheral to Computer LVDS Data 2 + |
| 27 | PDR2 - | | | Peripheral to Computer LVDS Data 2 - |
| 28 | PDR3 RTN | | | GND |
| 29 | PDR3 + | Synch. To PCKR | 10 x clock rate | Peripheral to Computer LVDS Data 3 + |
| 30 | PDR3 - | | | Peripheral to Computer LVDS Data 3 - |
| 31 | PCKR RTN | | | GND |
| 32 | PCKR + | Reverse Dir. Clock | Clock rate | Peripheral to Computer LVDS Clock + |
| 33 | PCKR - | | | Peripheral to Computer LVDS Clock - |
| 34 | PCNR RTN | | | GND |
| 35 | PCNR + | Synch. To PCKR | 10 x Clock rate | Peripheral to Computer LVDS Control + |
| 36 | PCNR - | | | Peripheral to Computer LVDS Control - |
| 37 | RESET# | | Asynchronous | Reset |

FIG. 20

| PCK | CK+ | CK+ | CK+ | CK+ | CK+ | CK- | CK- | CK- | CK- | CK- | CK+ | CK+ | CK+ | CK+ | CK+ | CK- | CK- | CK- | CK- | CK- |
|---|---|---|---|---|---|---|---|---|---|---|---|---|---|---|---|---|---|---|---|---|
| PD0 | BS0 | CM0# | A00 | A01 | A02 | A03 | A04 | A05 | A06 | A07 | BS0 | BE0# | D00 | D01 | D02 | D03 | D04 | D05 | D06 | D07 |
| PD1 | BS1 | CM1# | A08 | A09 | A10 | A11 | A12 | A13 | A14 | A15 | BS1 | BE1# | D08 | D09 | D10 | D11 | D12 | D13 | D14 | D15 |
| PD2 | BS2 | CM2# | A16 | A17 | A18 | A19 | A20 | A21 | A22 | A23 | BS2 | BE2# | D16 | D17 | D18 | D19 | D20 | D21 | D22 | D23 |
| PD3 | BS3 | CM3# | A24 | A25 | A26 | A27 | A28 | A29 | A30 | A31 | BS3 | BE3# | D24 | D25 | D26 | D27 | D28 | D29 | D30 | D31 |
| PCN | CN0 | CN1 | CN2 | CN3 | CN4 | CN5 | CN6 | CN7 | CN8 | CN9 | CN0 | CN1 | CN2 | CN3 | CN4 | CN5 | CN6 | CN7 | CN8 | CN9 |

ACM s CMI BUS Connector Plug PIN Position (88 pin):

| E14 | GND | GND | | P1 | GND | GND |
|---|---|---|---|---|---|---|
| E15 | P&D D0 + | TPA+ /VPD+ | | P2 | PD0 + | PDR0 + |
| E16 | P&D D0 - | TPA- /VPD- | | P3 | PD0 - | PDR0 - |
| E17 | GND | GND | | P4 | GND | GND |
| E18 | P&D CLK + | TPB+ /VPCK+ | | P5 | PD1 + | PDR1 + |
| E19 | P&D CLK - | TPB- /VPCK- | | P6 | PD1 - | PDR1 - |
| E20 | GND | 1394 Detect | | P7 | GND | GND |
| E21 | P&D D1 + | Reserved | | P8 | PD2 + | PDR2 + |
| E22 | P&D D1 - | Reserved | | P9 | PD2 - | PDR2 - |
| E23 | GND | Reserved | | P10 | GND | GND |
| E24 | P&D D2 + | Reserved | | P11 | PCK + | PCKR + |
| E25 | P&D D2 - | Reserved | | P12 | PCK - | PCKR - |
| E26 | DFP Detect | Config 2 | | P13 | Config 1 | Config 0 |
| | | | | | | |
| V10 | GND | V33 | | P14 | GND | GND |
| V11 | GND | V33 | | P15 | PD3 + | PDR3 + |
| V12 | GND | V33 | | P16 | PD3 - | PDR3 - |
| V13 | V33 | V33 | | P17 | RSTEH# | RSTEP# |
| V14 | V33 | V33 | | P18 | GREEN VIDEO | RED VIDEO |
| V15 | V33 | V33 | | P19 | GND | GND |
| V16 | V5 | V12 | | P20 | HSYNC | BLUE VIDEO |
| V17 | V5 | V12 | | P21 | VSYNC | GND |
| V18 | V5 | V12 | | P22 | DDC2: SCL | DDC2: SDA |

FIG. 28

| Pin No. | Symbol | Signal | Standard | Description |
|---|---|---|---|---|
| P2 | PDR0 + | LVDS | | Peripheral data reverse 0 + |
| P3 | PDR0 - | LVDS | | Peripheral data reverse 0 - |
| P5 | PDR1 + | LVDS | | Peripheral data reverse 1 + |
| P6 | PDR1 - | LVDS | | Peripheral data reverse 1 - |
| P8 | PDR2 + | LVDS | | Peripheral data reverse 2 + |
| P9 | PDR2 - | LVDS | | Peripheral data reverse 2 - |
| P11 | PCKR + | LVDS | | Peripheral clock reverse + |
| P12 | PCKR - | LVDS | | Peripheral clock reverse - |
| P15 | PDR3 + | LVDS | | Peripheral data reverse 3 + |
| P16 | PDR3 - | LVDS | | Peripheral data reverse 3 - |
| P24 | PD0 + | LVDS | | Peripheral data 0 + |
| P25 | PD0 - | LVDS | | Peripheral data 0 - |
| P27 | PD1 + | LVDS | | Peripheral data 1 + |
| P28 | PD1 - | LVDS | | Peripheral data 1 - |
| P30 | PD2 + | LVDS | | Peripheral data 2 + |
| P31 | PD2 - | LVDS | | Peripheral data 2 - |
| P33 | PCK + | LVDS | | Peripheral clock + |
| P34 | PCK - | LVDS | | Peripheral clock - |
| P37 | PD3 + | LVDS | | Peripheral data 3 + |
| P38 | PD3 - | LVDS | | Peripheral data 3 - |
| P13 | Config 0 | Static | 3.3v or GND | Configuration bit 0 |
| P35 | Config 1 | Static | 3.3v or GND | Configuration bit 1 |
| P17 | RESTEP# | TTL | 3.3v | Reset and Parity Error from console to ACM |
| P39 | RESTEH# | TTL | 3.3v | Reset and Parity Error from ACM to console |
| P18 | Red Video | Analog | | Video |
| P40 | Green Video | Analog | | Video |
| P20 | Blue Video | Analog | | Video |
| P42 | HSYNC | TTL | | Horizontal Sync |
| P43 | VSYNC | TTL | | Vertical Sync |
| P44 | DDC2 SCL | TTL | VESA DDC std 2 | DDC Clock |
| P22 | DDC2 SDA | TTL | VESA DDC std 2 | DDC Data |
| P1,P4,P7,P10, P14,P19,P21, P23,P26,P29, P32,P36,P41 | GND | | GND | Ground |

FIG. 29

| Pin No. | Symbol | Signal | Standard | Description |
|---|---|---|---|---|
| E2 | VPD+/TPA+ | | LVDS or 1394 | Video capture port data or 1394 |
| E3 | VPD-/TPA- | | LVDS or 1394 | Video capture port data or 1394 |
| E5 | VPCK+/TPA+ | | LVDS or 1394 | Video capture port data or 1394 |
| E6 | VPCK-/TPA- | | LVDS or 1394 | Video capture port data or 1394 |
| E15 | D0 + | TMDS | VESA P & D | Data 0 + |
| E16 | D0 - | TMDS | VESA P & D | Data 0 - |
| E18 | CLK + | TMDS | VESA P & D | Clock + |
| E19 | CLK - | TMDS | VESA P & D | Clock - |
| E21 | D1 + | TMDS | VESA P & D | Data 1 + |
| E22 | D1 - | TMDS | VESA P & D | Data 1 - |
| E24 | D2 + | TMDS | VESA P & D | Data 2 + |
| E25 | D2 - | TMDS | VESA P & D | Data 2 - |
| E13 | Config 2 | | | Configuration bit 2 |
| E26 | Config 3 | | | Configuration bit 3 |
| E1, E4, E14, E17, E20, E23 | GND | | GND | Ground |

| Pin No. | Symbol | Signal | Standard | Description |
|---|---|---|---|---|
| E7 | Reserved | | | Reserved |
| E8 | Reserved | | | Reserved |
| E9 | Reserved | | | Reserved |
| E10 | TV-CV/reserved | | NTSC | TV Composite Video or reserved |
| E11 | SV Y/reserved | | Super Video | SV Luminance or reserved |
| E12 | SV C/reserved | | Super Video | SV Chrominance or reserved |

FIG. 30

| | Symbol | Signal | Data Rate | Description |
|---|---|---|---|---|
| 1 | PD0 RTN | | | GND |
| 2 | PD0 + | Synch. To PCK | 6 x clock rate | Computer to Peripheral LVDS Data 0 + |
| 3 | PD0 - | Synch. To PCK | 6 x clock rate | Computer to Peripheral LVDS Data 0 - |
| 4 | PD1 RTN | | | GND |
| 5 | PD1 + | Synch. To PCK | 6 x clock rate | Computer to Peripheral LVDS Data 1 + |
| 6 | PD1 - | Synch. To PCK | 6 x clock rate | Computer to Peripheral LVDS Data 1 - |
| 7 | PD2 RTN | | | GND |
| 8 | PD2 + | Synch. To PCK | 6 x clock rate | Computer to Peripheral LVDS Data 2 + |
| 9 | PD2 - | Synch. To PCK | 6 x clock rate | Computer to Peripheral LVDS Data 2 - |
| 10 | PD3 RTN | | | GND |
| 11 | PD3 + | Synch. To PCK | 6 x clock rate | Computer to Peripheral LVDS Data 3 + |
| 12 | PD3 - | Synch. To PCK | 6 x clock rate | Computer to Peripheral LVDS Data 3 - |
| 13 | PCK RTN | | | GND |
| 14 | PCK + | Clock | Clock rate | Computer to Peripheral LVDS Clock + |
| 15 | PCK - | Clock | Clock rate | Computer to Peripheral LVDS Clock - |
| 16 | PDR0 RTN | | | GND |
| 17 | PDR0 + | Synch. To PCKR | 6 x clock rate | Peripheral to Computer LVDS Data 0 + |
| 18 | PDR0 - | Synch. To PCKR | 6 x clock rate | Peripheral to Computer LVDS Data 0 - |
| 19 | PDR1 RTN | | | GND |
| 20 | PDR1 + | Synch. To PCKR | 6 x clock rate | Peripheral to Computer LVDS Data 1 + |
| 21 | PDR1 - | Synch. To PCKR | 6 x clock rate | Peripheral to Computer LVDS Data 1 - |
| 22 | PDR2 RTN | | | GND |
| 23 | PDR2 + | Synch. To PCKR | 6 x clock rate | Peripheral to Computer LVDS Data 2 + |
| 24 | PDR2 - | Synch. To PCKR | 6 x clock rate | Peripheral to Computer LVDS Data 2 - |
| 25 | PDR3 RTN | | | GND |
| 26 | PDR3 + | Synch. To PCKR | 6 x clock rate | Peripheral to Computer LVDS Data 3 + |
| 27 | PDR3 - | Synch. To PCKR | 6 x clock rate | Peripheral to Computer LVDS Data 3 - |
| 28 | PCKR RTN | | | GND |
| 29 | PCK + | Reverse Dir. Clock | Clock rate | Peripheral to Computer LVDS Clock + |
| 30 | PCK - | Reverse Dir. Clock | Clock rate | Peripheral to Computer LVDS Clock - |
| 31 | RESTEH# | Host to Peripheral | asynchronous | Reset & Error signal |
| 32 | RESTEP# | Peripheral to Host | asynchronous | Reset & Error signal |

FIG. 31

| Master | Type | HMA1/HMD1 | HMA2/HMD2 | HMC1 | HMC2 | Resvd | NOOP |
|---|---|---|---|---|---|---|---|
| | 1st nibble | XX00 (PCI) | XX10 (PCI) | 1001 (Control) | 1101 (Control) | X011 | 1111 |
| | 2nd nibble | C/BE | Control bits | Control bits | Control bits | | |
| | 3rd to 6th | PCI A/D 1st seg. | PCI A/D 2nd seg. | Control 1st seg. | Control 2nd seg. | Other | Void |
| Target | Type | HTD1 | HTD2 | HTC1 | HTC2 | Resrd | NOOP |
| | 1st nibble | XX00 | XX10 | 0001 (Control) | 0101 (Control) | X011 | 1111 |
| | 2nd nibble | BE | Control bits | Control bits | Control bits | | |
| | 3rd to 6th | PCI D 1st seg. | PCI D 2nd seg. | Control 1st seg. | Control 2nd seg. | Other | Void |

FIG. 33

| Master | Type | PMA1 / PMD1 | PMA2 / PMD2 | PMC1 | PMC2 | Resvd | NOOP |
|---|---|---|---|---|---|---|---|
| | 1st nibble | XX00 (PCI) | XX10 (PCI) | X001(Control) | X101(Control) | XX11 | 1111 |
| | 2nd nibble | C/BE | Control bits | Control bits | Control bits | | |
| | 3rd to 6th | PCI A/D 1st seg. | PCI A/D 2nd seg. | Control 1st seg. | Control 2nd seg. | Other | Void |

| Target | Type | PTD1 | PTD2 | PTC1 | PTC2 | Resvd | NOOP |
|---|---|---|---|---|---|---|---|
| | 1st nibble | XX00 | XX10 | X001(Control) | X101 (Control) | XX11 | 1111 |
| | 2nd nibble | BE | Control bits | Control bits | Control bits | | |
| | 3rd to 6th | PCI D 1st seg. | PCI D 2nd seg. | Control 1st seg. | Control 2nd seg. | Other | Void |

FIG. 34

| ID bits (P0 P1 P2 P3) | Data Packet Type |
|---|---|
| X X 0 0 | PCI 1st address/data segment |
| X X 1 0 | PCI 2nd address/data segment |
| 0 0 0 1 | Control 1st segment with PCI response |
| 1 0 0 1 | Control 1st segment without PCI response |
| 0 1 0 1 | Control 2nd segment with PCI response |
| 1 1 0 1 | Control 2nd segment without PCI response |
| 0 0 1 1 | Reserved |
| 1 0 1 1 | Reserved |
| 0 1 1 1 | Initialization |
| 1 1 1 1 | NOOP |

FIG. 35

|  | PD0 | PD1 | PD2 | PD3 |
|---|---|---|---|---|
| 1st control /ID (HMA1 or HMD1) | FRAME# | IRDY# | 0: 1st data seg. | 0: PCI; Other=1 |
| 2nd control | C/BE0# | C/BE1# | C/BE2# | C/BE3# |
| 1st Data Segment | A/D0 | A/D8 | A/D16 | A/D24 |
| 1st Data Segment | A/D1 | A/D9 | A/D17 | A/D25 |
| 1st Data Segment | A/D2 | A/D10 | A/D18 | A/D26 |
| 1st Data Segment | A/D3 | A/D11 | A/D19 | A/D27 |
| 3rd control /ID (HMA2 or HMD2) | PAR (PCI) | LOCK# | 1: 2nd data seg. | 0: PCI; Other=1 |
| 4th control | GNT# | reserved | reserved | Cntl PAR (CMI) |
| 2nd Data Segment | A/D4 | A/D12 | A/D20 | A/D28 |
| 2nd Data Segment | A/D5 | A/D13 | A/D21 | A/D29 |
| 2nd Data Segment | A/D6 | A/D14 | A/D22 | A/D30 |
| 2nd Data Segment | A/D7 | A/D15 | A/D23 | A/D31 |

FIG. 36

|  | PD0 | PD1 | PD2 | PD3 |
|---|---|---|---|---|
| 1st control /ID (PMA1 or PMD1) | FRAME# | IRDY# | 0: 1st data seg. | 0: PCI; Other=1 |
| 2nd control | C/BE0# | C/BE1# | C/BE2# | C/BE3# |
| 1st Data Segment | A/D0 | A/D8 | A/D16 | A/D24 |
| 1st Data Segment | A/D1 | A/D9 | A/D17 | A/D25 |
| 1st Data Segment | A/D2 | A/D10 | A/D18 | A/D26 |
| 1st Data Segment | A/D3 | A/D11 | A/D19 | A/D27 |
| 3rd control /ID (PMA2 or PMD2) | PAR (PCI) | LOCK# | 1: 2nd data seg. | 0: PCI; Other=1 |
| 4th control | GNT# | reserved | reserved | Cntl PAR (CMI) |
| 2nd Data Segment | A/D4 | A/D12 | A/D20 | A/D28 |
| 2nd Data Segment | A/D5 | A/D13 | A/D21 | A/D29 |
| 2nd Data Segment | A/D6 | A/D14 | A/D22 | A/D30 |
| 2nd Data Segment | A/D7 | A/D15 | A/D23 | A/D31 |

FIG. 37

|  | PD0 | PD1 | PD2 | PD3 |
|---|---|---|---|---|
| 1st control /ID (HTD1 or PTD1) | 1 | 1 | 0: 1st data seg. | 0: PCI; Other=1 |
| 2nd control | reserved | reserved | reserved | reserved |
| 1st Data Segment | D0 | D8 | D16 | D24 |
| 1st Data Segment | D1 | D9 | D17 | D25 |
| 1st Data Segment | D2 | D10 | D18 | D26 |
| 1st Data Segment | D3 | D11 | D19 | D27 |
| 3rd control /ID (HTD2 or PTD2) | PAR (PCI) | reserved | 1: 2nd data seg. | 0: PCI; Other=1 |
| 4th control | GNT# | reserved | reserved | Cntl PAR (CMI) |
| 2nd Data Segment | D4 | D12 | D20 | D28 |
| 2nd Data Segment | D5 | D13 | D21 | D29 |
| 2nd Data Segment | D6 | D14 | D22 | D30 |
| 2nd Data Segment | D7 | D15 | D23 | D31 |

FIG. 38

33 Mhz PCI Read transaction:

| H > P | HMA1 | HMA2 | NOOP | NOOP | | | NOOP | NOOP | HMC1 | NOOP |
|---|---|---|---|---|---|---|---|---|---|---|
| P > H | NOOP | NOOP | PTC1 | NOOP | | | PTD1 | PTD2 | NOOP | NOOP |

FIG. 39

33 Mhz PCI Write transaction:

| H > P | HMA1 | HMA2 | NOOP | NOOP | HMD1 | HMD2 | NOOP | NOOP | HMD1 | HMD2 | NOOP |
|---|---|---|---|---|---|---|---|---|---|---|---|
| P > H | NOOP | NOOP | PTC1 | NOOP | NOOP | NOOP | PTC2 | NOOP | NOOP | NOOP | PTC1 |

FIG. 40

Peripheral to Host: PCI Target (on XPBus) Control data packets without PCI response :

| ID (PTC1) | PD0 | PD1 | PD2 | PD3 |
|---|---|---|---|---|
| | 0: PCI | 0: 1st control seg. | 0: Control | 1: Other |
| PCI Control Segment | PERR# | SERR# | REQ# | STOP# |
| CMI Control Segment | CMI PERR# | Buffer Full # | CMI REQ# | CMI GNT# |
| CPU 1st Control Segment | CPURST | INIT | reserved | reserved |
| CPU 2nd Control Segment | INTR | NMI | A20M# | IGNNE# |
| CPU 3rd Control Segment | SMI# | STPCLK# | SLP# | PAR (Cntl Packet) |

| ID (PTC2) | PD0 | PD1 | PD2 | PD3 |
|---|---|---|---|---|
| | 0: PCI | 1: 2nd control seg. | 0: Control | 1: Other |
| PCI Control Segment | PERR# | SERR# | REQ# | STOP# |
| CMI Control Segment | CMI PERR# | Buffer Full # | CMI REQ# | CMI GNT# |
| NB 1st Control Segment | SUSCLK | SUSSTAT1# | PHOLD# | |
| GPIO 1st Control Segment | GPIO (0) | GPIO (1) | GPIO (2) | GPIO (3) |
| GPIO 2nd Control Segment | GPIO (4) | GPIO (5) | reserved | PAR (Cntl Packet) |

FIG. 41

Peripheral to Host: PCI Target (on XPBus) Control data packets without PCI response:

| ID (PTC1) | PD0 | PD1 | PD2 | PD3 |
|---|---|---|---|---|
| PCI Control Segment | 1: No PCI | 0: 1st control seg. | 0: Control | 1: Other |
| CMI Control Segment | reserved | reserved | reserved | reserved |
| CPU 1st Control Segment | CMI PERR# | Buffer Full # | CMI REQ# | CMI GNT# |
| CPU 2nd Control Segment | CPURST | INIT | reserved | reserved |
| CPU 3rd Control Segment | INTR | NMI | A20M# | IGNNE# |
|  | SMI# | STPCLK# | SLP# | PAR (Cntl Packet) |

| ID (PTC2) | PD0 | PD1 | PD2 | PD3 |
|---|---|---|---|---|
| PCI Control Segment | 1: No PCI | 1: 2nd control seg. | 0: Control | 1: Other |
| CMI Control Segment | reserved | reserved | reserved | reserved |
| NB 1st Control Segment | CMI PERR# | Buffer Full # | CMI REQ# | CMI GNT# |
|  | SUSCLK | SUSSTAT1# | PHOLD# |  |
| GPIO 1st Control Segment | GPIO (0) | GPIO (1) | GPIO (2) | GPIO (3) |
| GPIO 2nd Control Segment | GPIO (4) | GPIO (5) | reserved | PAR (Cntl Packet) |

FIG. 42

Peripheral to Host: PCI Master (on XPBus) Control single data packet with PCI response:

| ID (PMC1) | PD0 | PD1 | PD2 | PD3 |
|---|---|---|---|---|
| PCI Control Segment | 0: PCI | 0: 1st control seg. | 0: Control | 1: Other |
| CMI Control Segment | PERR# | SERR# | reserved | reserved |
| CPU 1st Control Segment | CMI PERR# | Buffer Full # | CMI REQ# | CMI GNT# |
| CPU 2nd Control Segment | CPURST | INIT | reserved | reserved |
| CPU 3rd Control Segment | INTR | NMI | A20M# | IGNNE# |
| | SMI# | STPCLK# | SLP# | PAR (Cntl Packet) |

| ID (PMC2) | PD0 | PD1 | PD2 | PD3 |
|---|---|---|---|---|
| PCI Control Segment | 0: PCI | 1: 2nd control seg. | 0: Control | 1: Other |
| CMI Control Segment | PERR# | SERR# | reserved | reserved |
| NB 1st Control Segment | CMI PERR# | Buffer Full # | CMI REQ# | CMI GNT# |
| | SUSCLK | SUSSTAT1# | PHOLD# | reserved |
| GPIO 1st Control Segment | GPIO (0) | GPIO (1) | GPIO (2) | GPIO (3) |
| GPIO 2nd Control Segment | GPIO (4) | GPIO (5) | reserved | PAR (Cntl Packet) |

FIG. 43

Peripheral to Host: PCI Master (on XPBus) Control single data packet without PCI response:

| ID (PMC1) | PD0 | PD1 | PD2 | PD3 |
|---|---|---|---|---|
| | 1: No PCI | 0: 1st control seg. | 0: Control | 1: Other |
| PCI Control Segment | reserved | reserved | reserved | reserved |
| CMI Control Segment | CMI PERR# | Buffer Full # | CMI REQ# | CMI GNT# |
| CPU 1st Control Segment | CPURST | INIT | reserved | reserved |
| CPU 2nd Control Segment | INTR | NMI | A20M# | IGNNE# |
| CPU 3rd Control Segment | SMI# | STPCLK# | SLP# | PAR (Cntl Packet) |

| ID (PMC2) | PD0 | PD1 | PD2 | PD3 |
|---|---|---|---|---|
| | 1: No PCI | 1: 2nd control seg. | 0: Control | 1: Other |
| PCI Control Segment | reserved | reserved | reserved | reserved |
| CMI Control Segment | CMI PERR# | Buffer Full # | CMI REQ# | CMI GNT# |
| NB 1st Control Segment | SUSCLK | SUSSTAT1# | PHOLD# | reserved |
| GPIO 1st Control Segment | GPIO (0) | GPIO (1) | GPIO (2) | GPIO (3) |
| GPIO 2nd Control Segment | GPIO (4) | GPIO (5) | reserved | PAR (Cntl Packet) |

FIG. 44

Host to Peripheral: Target Control data packet :

| | PD0 | PD1 | PD2 | PD3 |
|---|---|---|---|---|
| ID (HTC1) | 0: PCI Target | 0: 1st segment | 0: Control | 1: Other |
| PCI Control Segment | PERR# | SERR# | REQ# | STOP# |
| CMI Control Segment | CMI PERR# | Buffer Full # | CMI REQ# | CMI GNT# |
| CPU 1st Control Segment | FERR# | reserved | reserved | reserved |
| Reserved | | | | |
| Reserved | | | | |

HTC2 is reserved for future use.

FIG. 45

Host to Peripheral: Master Control data packet :

| | PD0 | PD1 | PD2 | PD3 |
|---|---|---|---|---|
| ID (HMC1) | 0: PCI Master | 0: 1st segment | 0: Control | 1: Other |
| PCI Control Segment | PERR# | SERR# | reserved | reserved |
| CMI Control Segment | CMI PERR# | Buffer Full # | CMI REQ# | CMI GNT# |
| CPU 1st Control Segment | FERR# | reserved | reserved | reserved |
| Reserved | | | | |
| Reserved | | | | |

HMC2 is reserved for future use.

FIG. 46

| Name | Type | Pins | Description |
|---|---|---|---|
| AD[31::0] | TS | 32 | Multiplexed Address/Data. AD is driven to a valid state when GNT# is asserted. |
| C/BE[3::0]# | TS | 4 | Multiplexed Command/Byte Enables. For a two-address transaction, 1st address phase carries the command, and the 2nd address phase carries the transaction type. C/BE is driven to a valid state when GNT# is asserted. |
| FRAME# | STS | 1 | Indicates beginning and duration of a PCI transaction. When the bus is idle, FRAME# is driven to High for 1 cycle. A pull-up resistor sustains STS signal. |
| IRDY# | STS | 1 | Initiator Ready. IRDY# is driven High for 1 cycle if bus is idle, and the state is sustained by a pull-up resistor. |
| TRDY# | STS | 1 | Target Ready. When bus is idle, TRDY# is driven High for 1 cycle if bus is idle. An external pull-up resistor sustains STS signal. |
| DEVSEL# | STS | 1 | Device Select. DEVSEL# is asserted by target to indicate it is ready to accept the transaction. HIC decodes address of a transaction to decide the need to assert DEVSEL#. As an initiator, HIC waits for 5 cycles to detect assertion of DEVSEL# by the target; otherwise HIC terminates with a master abort. DEVSEL# is driven High for 1 cycle when bus is idle, and the state is sustained by a pull-up resistor. |
| STOP# | STS | 1 | Target request to stop transaction. There are 3 cases:<br>STOP#, TRDY# & DEVSEL# asserted: disconnect with data transfer<br>Only STOP# & DEVSEL# asserted: request initiator to retry later<br>Only STOP# asserted: target abort<br>STOP# is driven High for 1 cycle when bus is idle, and the state is sustained by a pull-up resistor. |
| PAR | TS | 1 | Even parity for 36 bits of AD & C/BE#. PAR is sent one cycle after address or data is valid. In write transaction, initiator sends PAR one cycle after write data is valid. In read transaction, target sends PAR one cycle after read data is valid. |
| LOCK# | Input | 1 | Initiator request lock on target downstream. LOCK# is asserted 1 clock cycle after address phase by an initiator wanting to perform an atomic operation that take more than one transaction to complete. HIC passes the LOCK# request to the secondary PCI bus. HIC does not drive LOCK# or propagate LOCK# upstream. |
| IDSEL# | Input | 1 | Chip Select for Type 0 configuration access. During a Type 0 configuration transaction, the initiator asserts IDSEL# during the address phase to select HIC. HIC responds by asserting DEVSEL#. |
| PERR# | STS | 1 | Data Parity Error on all transactions except Special Cycle. PERR# is driven one clock cycle after PAR. PERR# is asserted by target during write transactions, and by initiator during read transactions. |
| SERR# | OD | 1 | System Error. HIC asserts SERR# under the following conditions:<br>Address parity error, Secondary bus SERR# asserted,<br>Posted write transaction: data parity error on target bus, Posted write transaction discarded,<br>Master abort, Target abort<br>Delayed read or write transaction discarded, and<br>Delayed transaction master timeout. |
| REQ# | TS | 1 | Request for bus. If a target retry or disconnect is received in response to initiating a transaction, HIC deasserts REQ# for at least 2 cycles before asserting it again. |
| GNT# | Input | 1 | Bus is granted to HIC. HIC can initiate transaction if GNT# is asserted and the bus is idle. When HIC is not requesting bus and GNT# is asserted, HIC must drive AD, C/BE, and PAR to valid logic levels. |
| CLKRUN# | I/OD | 1 | Input indicating clock status. HIC can request the central clock resource to start, speed up or maintain the PCI clock. There are 3 clocking states:<br>Clock running, Clock about to stop/slow down, and Clock stopped/slowed. |
| PCICK | Input | 1 | PCI Clock. All inputs are sampled on the rising edge of PCICK. Frequency |

FIG. 47

XPBus Signals

| Name | Type | Pins | Description |
|---|---|---|---|
| PCK + | LVDS Output | 2 | Peripheral Clock Differential Signal Pair Output to XPBus |
| PD{3::0} + | LVDS Output | 8 | Peripheral Data Differential Signal Pair Output to XPBus |
| PCKR + | LVDS Input | 2 | Peripheral Clock Differential Signal Pair Input from XPBus |
| PDR{3::0} + | LVDS Input | 8 | Peripheral Data Differential Signal Pair Input from XPBus |

FIG. 48

XIS Bus Video Port Signals

| Name | Type | Pins | Description |
|---|---|---|---|
| VPCK + | LVDS Input | 2 | Video Port Clock Differential Signal Pair Input; 2 x Video clock rate |
| PCK + | LVDS Output | 2 | Video Port Data Differential Signal Pair Input; 10 bit/clock period |

FIG. 49

Video Port Signals

| Name | Type | Pins | Description |
|---|---|---|---|
| VPD [15::0] | Output | 16 | Video Port Data Output |
| VREF | Output | 1 | Vertical Reference |
| HREF | Output | 1 | Horizontal Reference |
| VCLK | Output | 1 | Video Pixel Clock |
| VRDY | Output | 1 | Video Source Ready |

FIG. 50

Flash Memory Interface Signals

| Name | Type | Pins | Description |
|---|---|---|---|
| A[18::0] | Output | 19 | Address for up to 512K x 8 Memory |
| DQ[7::0] | I/O | 8 | Data Input/Output |
| CE# | O | 1 | Chip Enable |
| WE# | O | 1 | Write Enable |
| OE# | O | 1 | Output Enable |
| WP# | O | 1 | Write protect |

FIG. 51

Test Port (JTAG) Signals

| Name | Type | Pins | Description |
|---|---|---|---|
| TCK | I | 1 | Test Clock |
| TDI | I | 1 | Test Data In |
| TDO | O | 1 | Test Data Out |
| TMS | I | 1 | Test Mode Select |

FIG. 52

CPU Signal

| Name | Type | Pins | Description |
|---|---|---|---|
| CPURST | I/OD | 1 | CPU Reset and PCI RST# |
| FERR# | I | 1 | Numeric Coprocessor Error |
| IGNNE# | OD | 1 | Ignore Numeric Exception |
| INIT | OD | 1 | Initialization |
| INTR | OD | 1 | CPU Interrupt; Pentium: active high; PII active low |
| A20M# | OD | 1 | Address 20 Mask; Keyboard Interface |
| NMI | OD | 1 | Non-Maskable Interrupt |
| SMI# | OD | 1 | System Management Interrupt |
| STPCLK# | OD | 1 | Stop Clock |
| SLP# | OD | 1 | Sleep |

FIG. 53

North Bridge Signals

| Name | Type | Pins | Description |
|---|---|---|---|
| SUSCLK | O | 1 | Suspend Clock from South Bridge. 32.768Khz for maintenance of DRAM Refresh. |
| SUSSTAT1# | O | 1 | Suspend Status Plane 1 |
| PHOLD# | O | 1 | PCI Hold |
| PHLDA# | I | 1 | PCI Hold Acknowledge |

FIG. 54

GPIO Signals

| Name | Type | Pins | Description |
|---|---|---|---|
| GPIO[0] | O | 1 | CPU_STP# - CPU Clock Stop (optional) |
| GPIO[1] | O | 1 | PCI_STP# - PCI Clock Stop (optional) |
| GPIO[7::2] | I/O | 6 | General Purpose Input/Output Signals |

FIG. 55

ERROR/RESET Signals

| Name | Type | Pins | Description |
|---|---|---|---|
| RSTEH | O | 1 | Signal uses for: Reset from Host, Parity error for PIC transmission, & no connect detection |
| RSTEP | I | 1 | Signal uses for: Reset from Peripheral, Parity error for HIC transmission, No connect detection |

FIG. 56

Power/Ground/OSC input Signals

| Name | Type | Pins | Description |
|---|---|---|---|
| OSCin | I | 1 | Oscillator input for LVDS clock |
| GND (PLL) | | 1 | PLL ground |
| VCC (PLL) | | 1 | PLL 3.3v |
| VCC (core) | | 2 | Core/CPU VCC = 3.3v |
| VCC (LVDS) | | 2 | LVDS VCC = 3.3v |
| VCC (VP) | | 1 | Video port: all output signals; VCC = 3.3v |
| VCC (PCI) | | 2 | PCI VCC = 5v tolerant or 3.3v |
| VCC (Flash) | | 1 | Flash memory VCC = 5v tolerant or 3.3v |
| GND (core) | | 2 | Core ground |
| GND (LVDS) | | 2 | LVDS ground |
| GND (PCI) | | 2 | PCI ground |
| GND (Flash) | | 1 | Flash memory ground |
| Reserved | | 5 | Reserved pins |

FIG. 57

COMMUNICATION CHANNEL AND INTERFACE DEVICES FOR BRIDGING COMPUTER INTERFACE BUSES

CROSS-REFERENCE TO RELATED APPLICATIONS

This application claims any and all benefits as provided by law of U.S. Provisional Application No. 60/083,886 filed May 1, 1998 and of U.S. Provisional Application No. 60/092,706 filed on Jul. 14, 1998.

This application is being filed concurrently with the application of William W. Y. Chu for "Personal Computer Peripheral Console With Attached Computer Module", filed on Sep. 8, 1998 now U.S. Pat. No. 6,216,185, and incorporates the material therein by reference.

BACKGROUND OF THE INVENTION

The present invention generally relates to computer interfaces. More specifically, the present invention relates to an interface channel that interfaces two computer interface buses that operate under protocols that are different from that used by the interface channel.

Interfaces coupling two independent computer buses are well known in the art. A block diagram of a computer system utilizing such a prior art interface is shown in FIG. 1. In FIG. 1, a primary peripheral component interconnect (PCI) bus 105 of a notebook PC 100 is coupled to a secondary PCI bus 155 in a docking system 150 (also referred to as docking station 150) through high pin count connectors 101 and 102, which are normally mating connectors. The high pin count connectors 101 and 102 contain a sufficiently large number of pins so as to carry PCI bus signals between the two PCI buses without any translation. The main purpose for interfacing the two independent PCI buses is to allow transactions to occur between a master on one PCI bus and a target on the other PCI bus. The interface between these two independent PCI buses additionally includes an optional PCI to PCI bridge 160, located in the docking station 150, to expand the add on capability in docking station 150. The bridge 160 creates a new bus number for devices behind the bridge 160 so that they are not on the same bus number as other devices in the system thus increasing the add on capability in the docking station 150.

An interface such as that shown in FIG. 1 provides an adequate interface between the primary and secondary PCI buses. However, the interface is limited in a number of ways. The interface transfers signals between the primary and secondary PCI buses using the protocols of a PCI bus. Consequently, the interface is subject to the limitations under which PCI buses operate. One such limitation is the fact that PCI buses are not cable friendly. The cable friendliness of the interface was not a major concern in the prior art. However, in the context of the computer system of the present invention, which is described in the present inventor's (William W. Y. Chu's) application for "Personal Computer Peripheral Console With Attached Computer Module" filed concurrently with the present application on Sep. 8, 1998 and incorporated herein by reference, a cable friendly interface is desired for interfacing an attached computer module (ACM) and a peripheral console of the present invention. Furthermore, as a result of operating by PCI protocols, the prior art interface includes a very large number of signal channels with a corresponding large number of conductive lines (and a similarly large number of pins in the connectors of the interface) that are commensurate in number with the number of signal lines in the PCI buses which it interfaces. One disadvantage of an interface having a relatively large number of conductive lines and pins is that it costs more than one that uses a fewer number of conductive lines and pins. Additionally, an interface having a large number of conductive lines is bulkier and more cumbersome to handle. Finally, a relatively large number of signal channels in the interface renders the option of using differential voltage signals less viable because a differential voltage signal method would require duplicating a large number of signal lines. It is desirable to use a low voltage differential signal (LVDS) channel in the computer system of the present invention because an LVDS channel is more cable friendly, faster, consumes less power, and generates less noise, including electromagnetic interferences (EMI), than a PCI channel. The term LVDS is herein used to generically refer to low voltage differential signals and is not intended to be limited to any particular type of LVDS technology.

BRIEF SUMMARY OF THE INVENTION

The present invention overcomes the aforementioned disadvantages of the prior art by interfacing two PCI or PCI-like buses using a non-PCI or non-PCI-like channel. In the present invention, PCI control signals are encoded into control bits and the control bits, rather than the control signals that they represent, are transmitted on the interface channel. At the receiving end, the control bits representing control signals are decoded back into PCI control signals prior to being transmitted to the intended PCI bus.

The fact that control bits rather than control signals are transmitted on the interface channel allows using a smaller number of signal channels and a correspondingly small number of conductive lines in the interface channel than would otherwise be possible. This is because the control bits can be more easily multiplexed at one end of the interface channel and recovered at the other end than control signals. This relatively small number of signal channels used in the interface channel allows using LVDS channels for the interface. As mentioned above, an LVDS channel is more cable friendly, faster, consumes less power, and generates less noise than a PCI bus channel, which is used in the prior art to interface two PCI buses. Therefore, the present invention advantageously uses an LVDS channel for the hereto unused purpose of interfacing PCI or PCI-like buses. The relatively smaller number of signal channels in the interface also allows using connectors having smaller pins counts. As mentioned above an interface having a smaller number of signal channels and, therefore, a smaller number of conductive lines is less bulky and less expensive than one having a larger number of signal channels. Similarly, connectors having a smaller number of pins are also less expensive and less bulky than connectors having a larger number of pins.

In one embodiment, the present invention encompasses an apparatus for bridging a first computer interface bus and a second computer interface bus, in a microprocessor based computer system where each of the first and second computer interface buses have a number of parallel multiplexed address/data bus lines and operate at a clock speed in a predetermined clock speed range having a minimum clock speed and a maximum clock speed. The apparatus comprises an interface channel having a clock channel and a plurality of bit channels for transmitting bits; a first interface controller coupled to the first computer interface bus and to the interface channel to encode first control signals from the first computer interface bus into first control bits to be transmitted on the interface channel and to decode second control bits received from the interface channel into second control signals to be transmitted to the first computer interface bus;

and a second interface controller coupled to the interface channel and the second computer interface bus to decode the first control bits from the interface channel into third control signals to be transmitted on the second computer interface bus and to encode fourth control signals from the second computer interface bus into the second control bits to be transmitted on the interface channel.

In one embodiment, the first and second interface controllers comprise a host interface controller (HIC) and a peripheral interface controller (PIC), respectively, the first and second computer interface buses comprise a primary PCI and a secondary PCI bus, respectively, and the interface channel comprises an LVDS channel.

In a preferred embodiment, the interface channel has a plurality of serial bit channels numbering fewer than the number of parallel bus lines in each of the PCI buses and operates at a clock speed higher than the clock speed at which any of the bus lines operates. More specifically, the interface channel includes two sets of unidirectional serial bit channels which transmit data in opposite directions such that one set of bit channels transmits serial bits from the HIC to the PIC while the other set transmits serial bits from the PIC to the HIC. For each cycle of the PCI clock, each bit channel of the interface channel transmits a packet of serial bits.

The HIC and PIC each include a bus controller to interface with the first and second computer interface buses, respectively, and to manage transactions that occur therewith. The HIC and PIC also include a translator coupled to the bus controller to encode control signals from the first and second computer interface buses, respectively, into control bits and to decode control bits from the interface channel into control signals. Additionally, the HIC and PIC each include a transmitter and a receiver coupled to the translator. The transmitter converts parallel bits into serial bits and transmits the serial bits to the interface channel. The receiver receives serial bits from the interface channel and converts them into parallel bits.

BRIEF DESCRIPTION OF THE DRAWINGS

FIG. 3 is a partial block diagram of a computer system using the interface of the present invention as a bridge between the north and south bridges of the computer system.

FIG. 7 is a table showing how different PCI control signals are managed in the case where the HIC is a target on the host PCI bus.

FIG. 8 is a table showing how different PCI control signals are managed in the case where the HIC is a master on the host PCI bus.

FIG. 12 is a table showing how different PCI control signals are managed in the case where the PIC is a target on the secondary PCI bus.

FIG. 13 is a table showing how different PCI control signals are managed in the case where the PIC is a master on the secondary PCI bus.

FIG. 17 shows a schematic diagram of the pin out of the peripheral connector and the video connector in FIG. 16.

FIGS. 18 and 19 are tables including the pin number, symbol, signal, standard and description for the pins on the peripheral and video connectors, respectively.

FIG. 20 is a table showing the symbols, signals, data rate and description of signals in a first embodiment of the XPBus.

FIG. 21 is a table showing the information transmitted on the XPBus during two clock cycles of the XPBus in one embodiment of the present invention where 10 data bits transmitted in each clock cycle of the XPBus.

FIG. 22 is a table showing information transmitted on the XPBus during four clock cycles of the XPBus in another embodiment of the present invention where 10 data bits are transmitted in each clock cycle of the XPBus.

FIG. 28 shows a schematic diagram of the pin out of the peripheral connector and the video/extension connector of FIG. 27.

FIG. 29 is a table including the pin number, symbol, signal, standard and description for the pins on the peripheral connector shown in FIG. 27.

FIG. 30 is a table including the pin number, symbol, signal, standard and description for the pins on the video/extension connector shown in FIG. 27.

FIG. 31 is a table showing the symbols, signals, data rate and description of signals transmitted in a second embodiment of the XPBus.

FIGS. 33 and 34 are tables showing the data packet types transmitted from HIC 2500 to PIC 2600 and from PIC 2600 to HIC 2500, respectively.

FIG. 35 is a table showing different types of first nibbles and their corresponding data packet types.

FIG. 36 shows the six nibbles of data packet types HMA1/HMD1 and HMA2/HMD2 sent on lines PD0 to PD3 from the HIC to the PIC.

FIG. 37 is a table that shows the six nibbles of data packet types PMA1/PMD1 and PMA2/PMD2 sent on lines PD0 to PD3 from the PIC to the HIC.

FIG. 38 is a table showing a PCI target read data packet for both HIC to PIC and PIC to HIC and includes the six nibbles for data packet types HTD1/PTD1 and HTD2/PTD2.

FIG. 39 is a table that shows an example of a PCI read data packet transaction with the HIC as master and the PIC as target.

FIG. 40 is a table that shows an example of a PCI write data packet transaction with the HIC as master and the PIC as target.

FIG. 41 is a table that shows PCI target control data packets sent from the PIC to the HIC on the XPBus with PCI response.

FIG. 42 is a table that shows PCI target control data packets sent from the PIC to the HIC on the XPBus without PCI response.

FIG. 43 is a table that shows PCI master control data packets sent from the PIC to the HIC on the XPBus with PCI response.

FIG. 44 is a table that shows PCI master control data packets sent from the PIC to the HIC on the XPBus without PCI response.

FIGS. 45 and 46 are tables that show the HIC to PIC target control data packet and master control data packet, respectively.

FIG. 47 is a table showing the names, types, number of pins dedicated to, and the description of the primary bus PCI signals.

FIG. 48 is a table showing the names, types, number of pins dedicated to, and the description of the XPBus signals.

FIGS. 49 and 50 are tables showing the names, types, number of pins dedicated to, and the description of the XIS bus video port signals and the video port signals, respectively.

FIG. 51 is a table showing the names, types, number of pins dedicated to, and the description of the flash memory interface signals.

FIG. 52 is a table showing the names, types, number of pins dedicated to, and the description of the test port (JTAG) signals.

FIG. 53 is a table showing the names, types, number of pins dedicated to, and the description of the CPU signals.

FIG. 54 is a table showing the names, types, number of pins dedicated to, and the description of the north bridge signals.

FIG. 55 is a table showing the names, types, number of pins dedicated to, and the description of the GPIO signals.

FIG. 56 is a table showing the names, types, number of pins dedicated to, and the description of the error/reset signals.

FIG. 57 is a table showing the names, types, number of pins dedicated to, and the description of the power/ground/oscillator input signals.

DETAILED DESCRIPTION OF THE INVENTION

Figure 1:
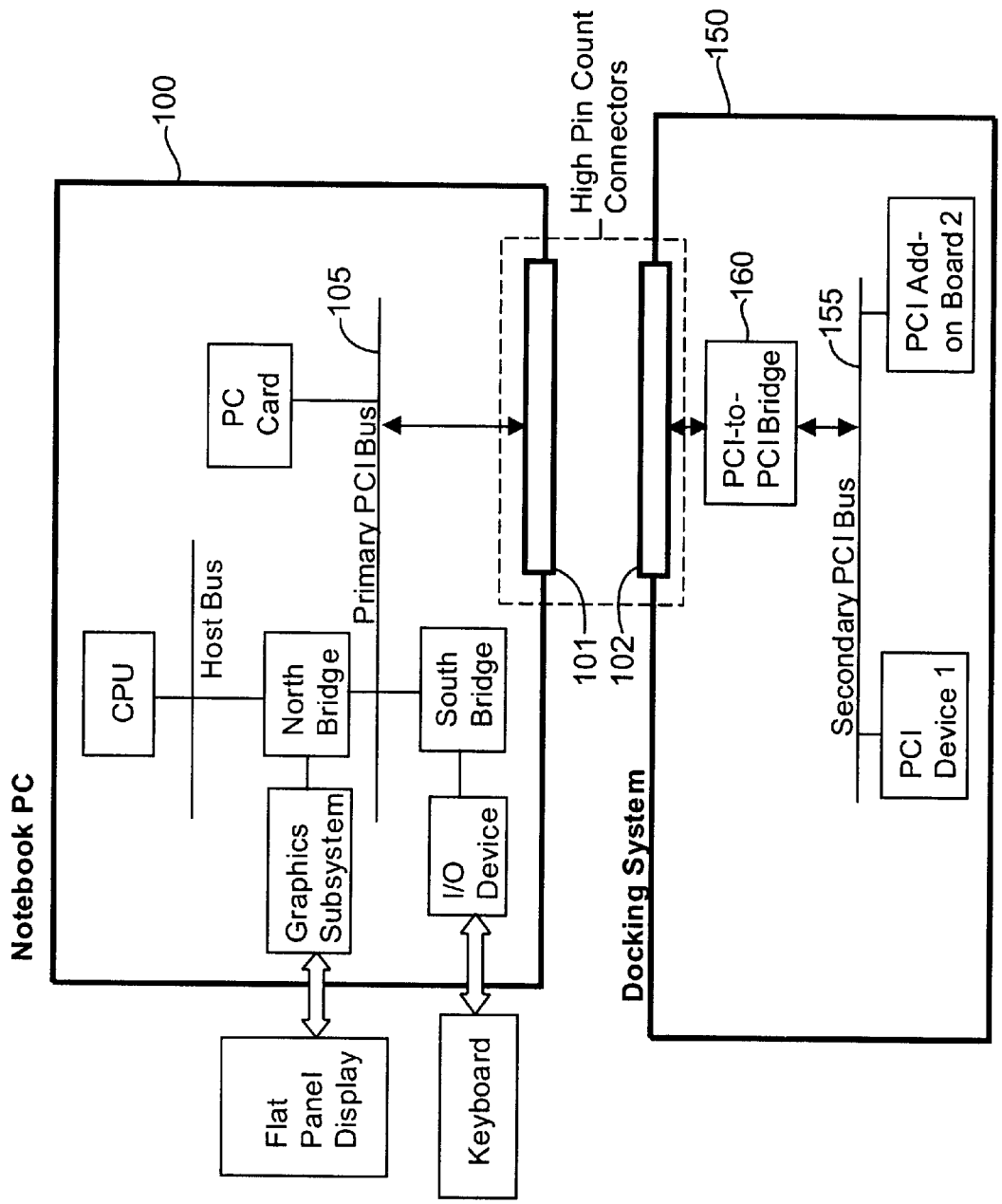
FIG. 1 is a block diagram of a computer system using a prior art interface between a primary and a secondary PCI bus.
Figure 2:
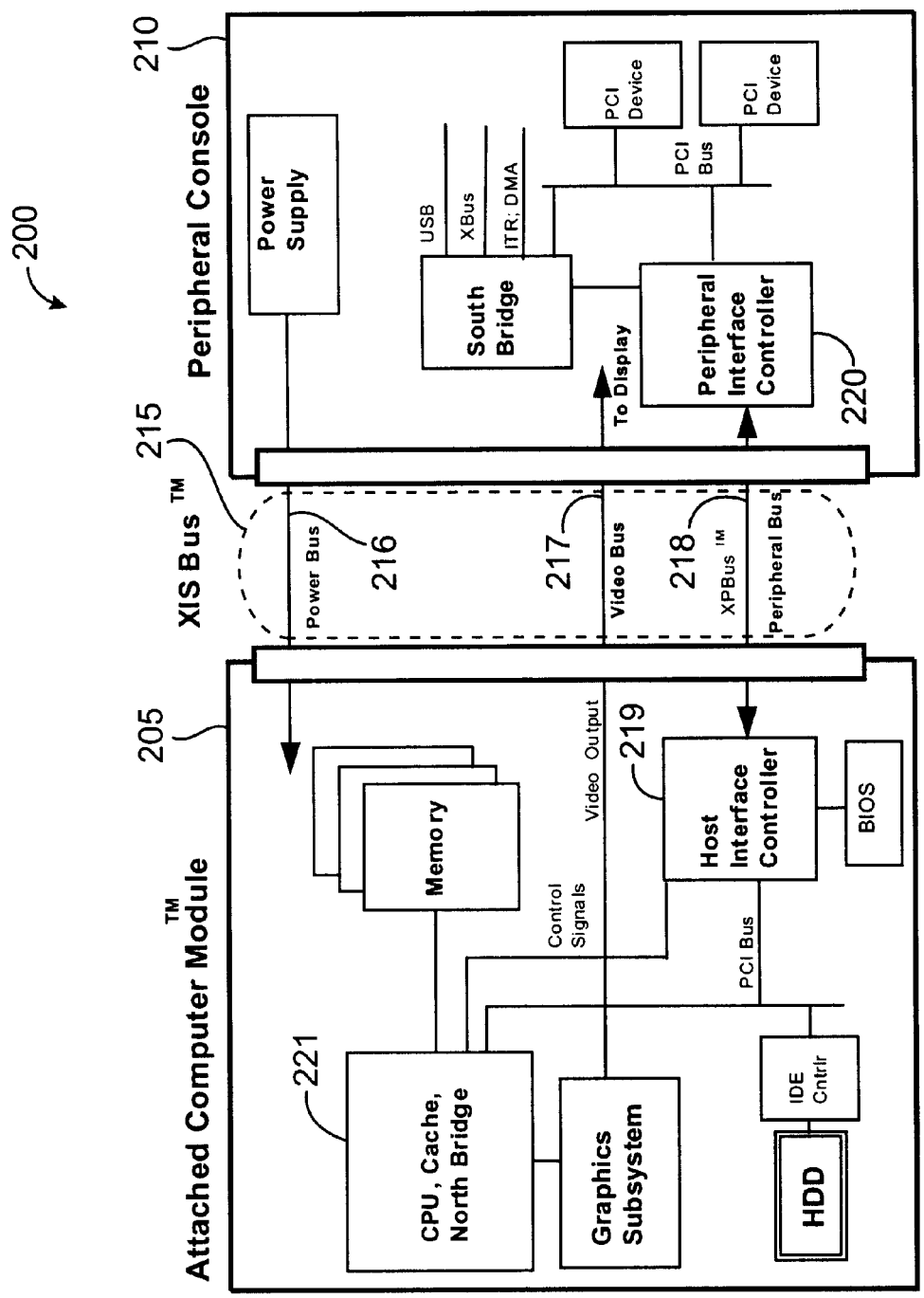
FIG. 2 is a block diagram of one embodiment of a computer system using the interface of the present invention.

FIG. 2 is a block diagram of one embodiment of a computer system 200 using the interface of the present invention. Computer system 200 includes an attached computer module (ACM) 205 and a peripheral console 210, which are described in greater detail in the application of William W. Y. Chu for "Personal Computer Peripheral Console With Attached Computer Module" filed concurrently with the present application on Sep. 8, 1998 and incorporated herein by reference. The ACM 205 and the peripheral console 210 are interfaced through an exchange interface system (XIS) bus 215. The XIS bus 215 includes power bus 216, video bus 217 and peripheral bus (XPBus) 218, which is also herein referred to as an interface channel. The power bus 216 transmits power between ACM 205 and peripheral console 210. In a preferred embodiment power bus 216 transmits power at voltage levels of 3.3 volts, 5 volts and 12 volts. Video bus 217 transmits video signals between the ACM 205 and the peripheral console 210. In a preferred embodiment, the video bus 217 transmits analog Red Green Blue (RGB) video signals for color monitors, digital video signals (such as Video Electronics Standards Association (VESA) Plug and Display's Transition Minimized Differential Signaling (TMDS) signals for flat panel displays), and television (TV) and/or super video (S-video) signals. The XPBus 218 is coupled to host interface controller (HIC) 219 and to peripheral interface controller (PIC) 220, which is also sometimes referred to as a bay interface controller.

Figure 4:
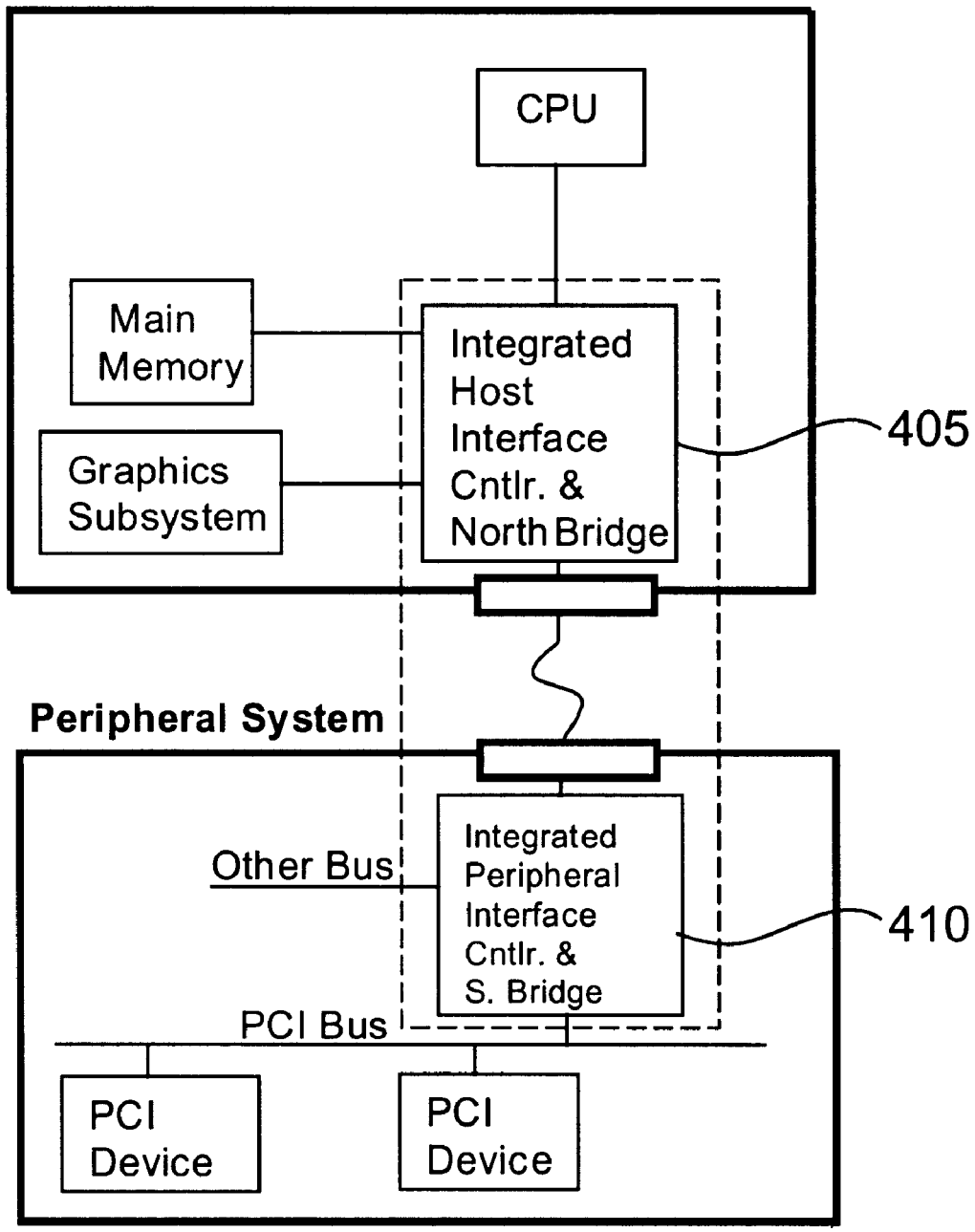
FIG. 4 is a partial block diagram of a computer system in which the north and south bridges are integrated with the host and peripheral interface controllers, respectively.

In the embodiment shown in FIG. 2, HIC 219 is coupled to an integrated unit 221 that includes a CPU, a cache and a north bridge. In another embodiment, such as that shown in FIG. 3, the CPU 305 and north bridge 310 are separate rather than integrated units. In yet another embodiment, such as that shown in FIG. 4, the HIC and PIC are integrated with the north and south bridges, respectively, such that integrated HIC and north bridge unit 405 includes an HIC and a north bridge, while integrated PIC and south bridge unit 410 includes a PIC and a south bridge.

Figure 5:
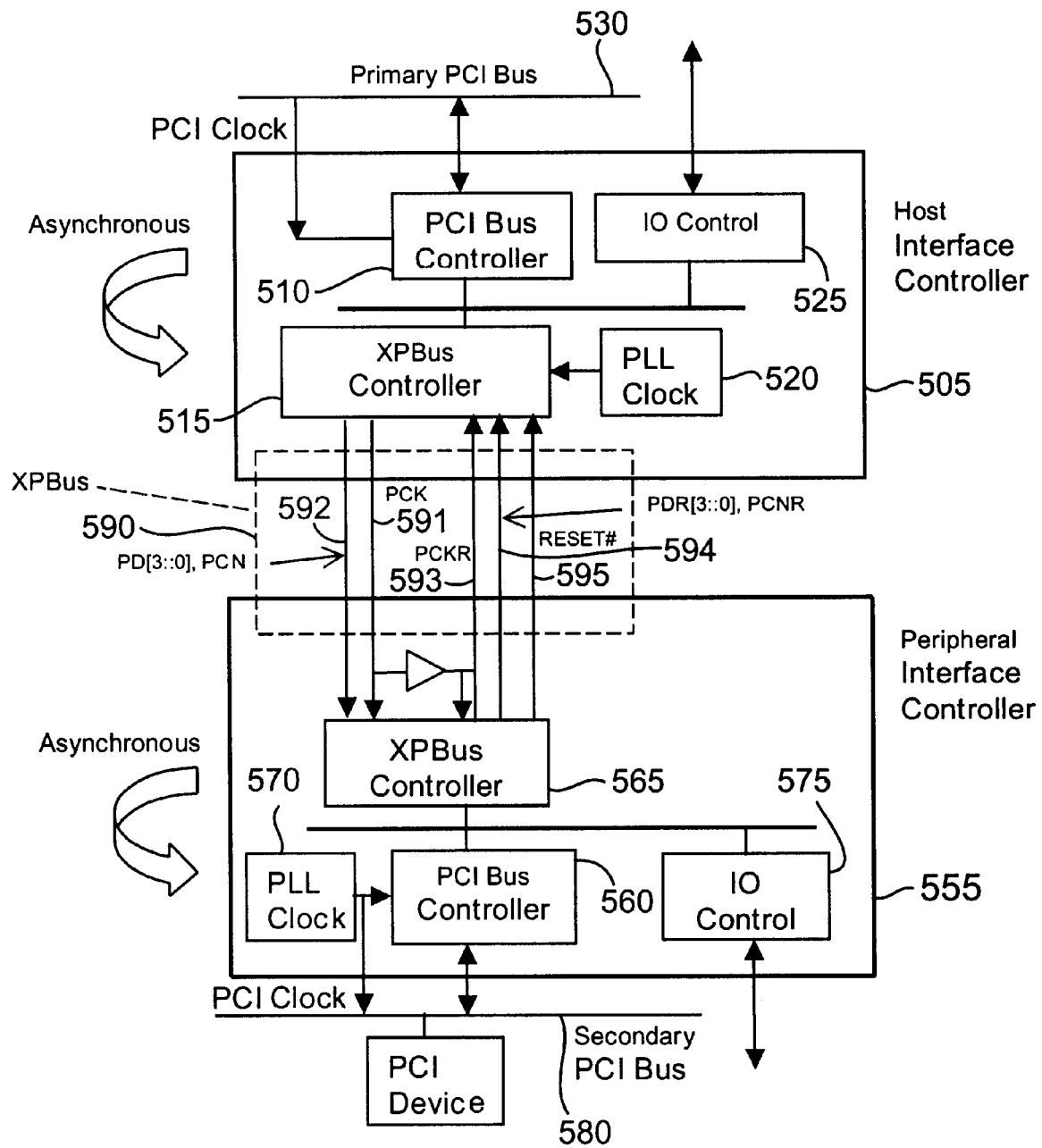
FIG. 5 is a block diagram of one embodiment of the host interface controller and the peripheral interface controller of the present invention.

FIG. 5 is a more detailed block diagram of one embodiment of an HIC 505 and a PIC 555 of the present invention. HIC 505 includes a peripheral component interconnect (PCI) bus controller 510, an XPBus controller 515, a phase lock loop (PLL) clock 520 and an input/output (IO) control 525. Similarly, PIC 555 includes a PCI bus controller 560, an XPBus controller 565, a PLL clock 570 and an IO control 575. PCI bus controllers 510 and 560 are coupled to the primary and secondary PCI buses 530 and 580, respectively, and manage PCI transactions on the primary and secondary PCI buses 530 and 580, respectively. Similarly, XPBus Controllers 515 and 565 are coupled to XPBus 590. XPBus controller 515 drives the PCK line 591 and PD[0::3] and PCN lines 592 while XPBus controller 565 drives the PCKR lines 593, the PDR[0::3] and PCNR lines 594 and the RESET# line 595.

PCI bus controller 510 receives PCI clock signals from the primary PCI bus 530 and is synchronized to the PCI clock. However, as indicated in FIG. 5, the XPBus controller 515 is asynchronous with the PCI bus controller 510. Instead, the XPBus controller receives a clock signal from the PLL clock 520 and is synchronized therewith. PLL clock 520 generates a clock signal independent of the PCI clock. The asynchronous operation of the PCI bus and the XPBus allows the PCI Bus to change in frequency, for example as in a power down situation, without directly affecting the XPBus clocking. In the embodiment shown in FIG. 5, the PLL clock 520 generates a clock signal having a frequency of 66 MHz, which is twice as large as the 33 MHz frequency of the PCI clock. (The clock signal generated by the PLL clock may have a clock speed different from, including lower than, 66 MHz. For example, in another embodiment, which is discussed in greater detail below, the PLL clock 520 generates a clock signal having a frequency of 132 MHz.)

The XPBus 590 operates at the clock speed generated by the PLL clock 520. Therefore, PCK, the clock signal from the XPBus controller 515 to XPBus controller 565 has the same frequency as the clock signal generated by PLL clock 520. XPBus controller 565 receives the PCK signal after it has been buffered and operates at the clock speed of PCK. The buffered version of the clock signal PCK is used to generate the clock signal PCKR, the clock signal form the XPBus controller 565 to XPBus controller 515. Accordingly, PCKR also has the same frequency as that generated by the PLL clock 520. The synchronous operation of PCK and PCKR provides for improved reliability in the system. In another embodiment, PCKR may be generated independently of PCK and may have a frequency different from that of PCK. It is to be noted that even when PCKR is generated from PCK, the slew between PCK and PCKR cannot be guaranteed because of the unknown cable length used for the XPBus. For a cable that is several feet long, the cable propagation delay alone can be several nano seconds.

As indicated in FIG. 5, PLL clock 570 is asynchronous with the XPBus controller 565. Instead, PLL clock 570 independently generates a clock signal that is used as a PCI clock signal on the secondary PCI bus 580. The secondary PCI bus 580 operates at the same clock speed as the primary PCI bus 530, namely at a frequency of 33 MHz.

Figure 6:
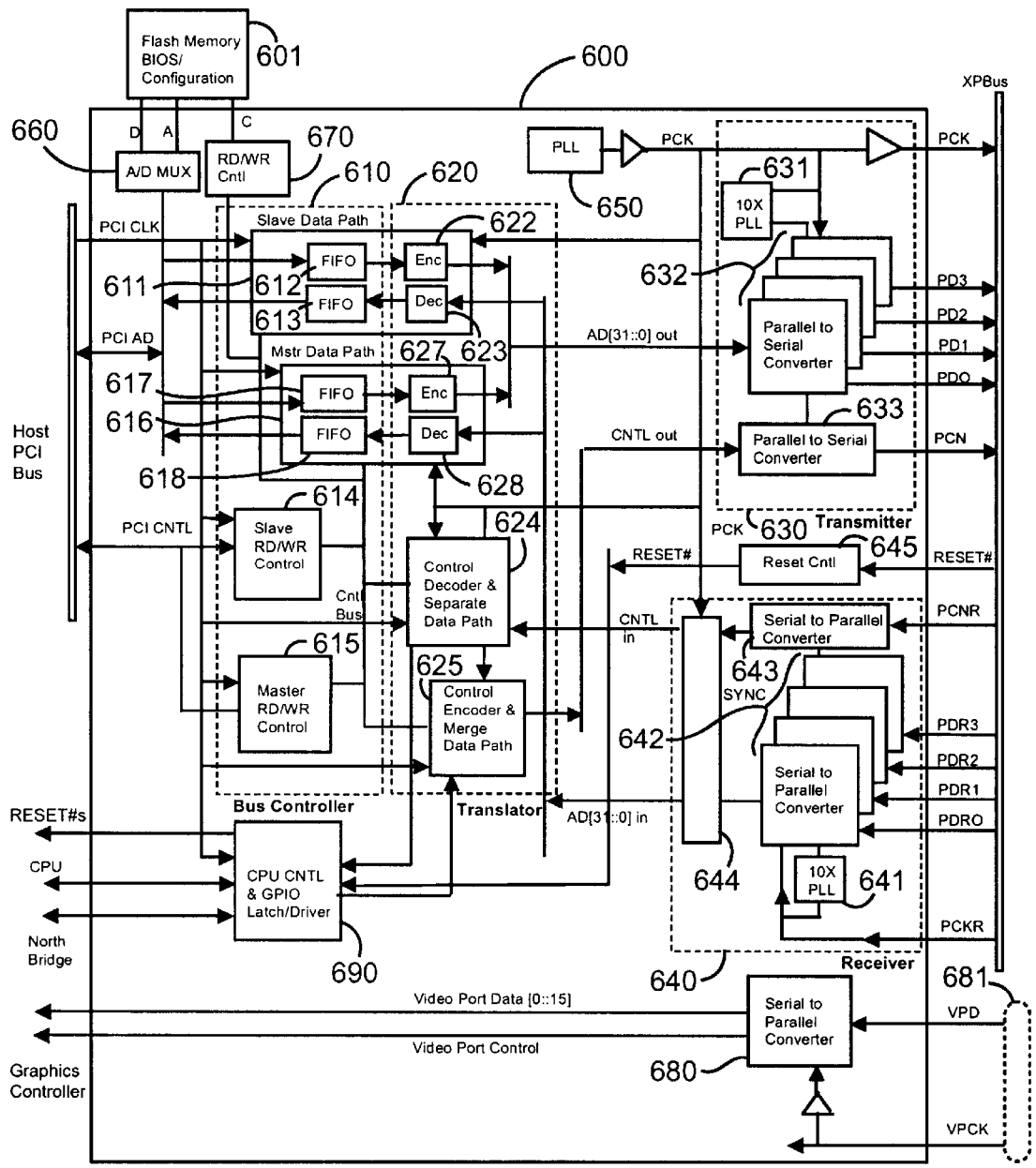
FIG. 6 is a detailed block diagram of one embodiment of the host interface controller of the present invention.

FIG. 6 is a detailed block diagram of one embodiment of the HIC of the present invention. As shown in FIG. 6, HIC 600 comprises bus controller 610, translator 620, transmitter 630, receiver 640, a PLL 650, an address/data multiplexer (A/D MUX) 660, a read/write controller (RD/WR Cntl) 670, a video serial to parallel converter 680 and a CPU control & general purpose input/output latch/driver (CPU CNTL & GPIO latch/driver) 690.

HIC 600 is coupled to an optional flash memory BIOS configuration unit 601. Flash memory unit 601 stores basic input output system (BIOS) and PCI configuration information and supplies the BIOS and PCI configuration information to A/D MUX 660 and RD/WR Control 670, which control the programming, read, and write of flash memory unit 601.

Bus controller 610 is coupled to the host PCI bus, which is also referred to herein as the primary PCI bus, and manages PCI bus transactions on the host PCI bus. Bus controller 610 includes a slave (target) unit 611 and a master unit 616. Both slave unit 611 and master unit 616 each include two first in first out (FIFO) buffers, which are preferably asynchronous with respect to each other since the input and output of the two FIFOs in the master unit 616 as well as the two FIFOs in the slave unit 611 are clocked by different clocks, namely the PCI clock and the PCK. Additionally, slave unit 611 includes encoder 622 and decoder 623, while master unit 616 includes encoder 627 and decoder 628. The FIFOs 612, 613, 617 and 618 manage data transfers between the host PCI bus and the XPBus, which in the embodiment shown in FIG. 6 operate at 33 MHz and 66 MHz, respectively. PCI address/data (AD) from the host PCI bus is entered into FIFOs 612 and 617 before they are encoded by encoders 622 and 623. Encoders 622 and 623 format the PCI address/data bits to a form more suitable for parallel to serial conversion prior to transmittal on the XPBus. Similarly, address and data information from the receivers is decoded by decoders 623 and 628 to a form more suitable for transmission on the host PCI bus. Thereafter the decoded data and address information is passed through FIFOs 613 and 618 prior to being transferred to the host PCI bus. FIFOs 612, 613, 617 and 618, allow bus controller 610 to handle posted and delayed PCI transactions and to provide deep buffering to store PCI transactions.

Bus controller 610 also comprises slave read/write control (RD/WR Cntl) 614 and master read/write control (RD/WR Cntl) 615. RD/WR controls 614 and 615 are involved in the transfer of PCI control signals between bus controller 610 and the host PCI bus.

Bus controller 610 is coupled to translator 620. Translator 620 comprises encoders 622 and 627, decoders 623 and 628, control decoder & separate data path unit 624 and control encoder & merge data path unit 625. As discussed above encoders 622 and 627 are part of slave data unit 611 and master data unit 616, respectively, receive PCI address and data information from FIFOs 612 and 617, respectively, and encode the PCI address and data information into a form more suitable for parallel to serial conversion prior to transmittal on the XPBus. Similarly, decoders 623 and 628 are part of slave data unit 611 and master data unit 616, respectively, and format address and data information from receiver 640 into a form more suitable for transmission on the host PCI bus. Control encoder & merge data path unit 625 receives PCI control signals from the slave RD/WR control 614 and master RD/WR control 615. Additionally, control encoder & merge data path unit 625 receives control signals from CPU CNTL & GPIO latch/driver 690, which is coupled to the CPU and north bridge (not shown in FIG. 6). Control encoder & merge data path unit 625 encodes PCI control signals as well as CPU control signals and north bridge signals into control bits, merges these encoded control bits and transmits the merged control bits to transmitter 630, which then transmits the control bits on the data lines PD0 to PD3 and control line PCN of the XPBus. Examples of control signals include PCI control signals and CPU control signals. A specific example of a control signal is FRAME# used in PCI buses. A control bit, on the other hand is a data bit that represents a control signal. Control decoder & separate data path unit 624 receives control bits from receiver 640 which receives control bits on data lines PDR0 to PDR3 and control line PCNR of the XPBus. Control decoder & separate data path unit 624 separates the control bits it receives from receiver 640 into PCI control signals, CPU control signals and north bridge signals, and decodes the control bits into PCI control signals, CPU control signals, and north bridge signals all of which meet the relevant timing constraints.

Transmitter 630 receives multiplexed parallel address/data (A/D) bits and control bits from translator 620 on the AD[31::0] out and the CNTL out lines, respectively. Transmitter 630 also receives a clock signal from PLL 650. PLL 650 takes a reference input clock and generates PCK that drives the XPBus. PCK is asynchronous with the PCI clock signal and operates at 66 MHz, twice the speed of the PCI clock of 33 MHz. The higher speed is intended to accommodate at least some possible increases in the operating speed of future PCI buses. As a result of the higher speed, the XPBus may be used to interface two PCI or PCI-like buses operating at 66 MHz rather than 33 MHz or having 64 rather than 32 multiplexed address/data lines.

The multiplexed parallel A/D bits and some control bits input to transmitter 630 are serialized by parallel to serial converters 632 of transmitter 630 into 10 bit packets. These bit packets are then output on data lines PD0 to PD3 of the XPBus. Other control bits are serialized by parallel to serial converter 633 into 10 bit packets and send out on control line PCN of the XPBus.

A 10× multiplier 631 receives PCK, multiplies it by a factor of 10 and feeds a clock signal 10 times greater than PCK into the parallel to serial converters 632 and 633. The parallel to serial converters 632 and 633 perform bit shifting at 10 times the PCK rate to serialize the parallel bits into 10 bit packets. As the parallel to serial converters 632 and 633 shift bits at 10 times the PCK rate, the bit rate for the serial bits output by the parallel to serial converters is 10 times higher than PCK rate, i.e., 660 MHz. However, the rate at which data packets are transmitted on the XPBus is the same as the PCK rate, i.e., 66 MHz. As the PCI buses operate at a clock and bit rate of 33 MHz, the XPBus has a clock rate that is twice as large and a bit rate per bit line (channel) that is 20 times as large as that of the PCI buses which it interfaces.

Receiver 640 receives serial bit packets on data lines PDR0 to PDR3 and control line PCNR. Receiver 640 also receives PCKR on the XPBus as well as the clock signal PCK from PLL 650. The synchronizer (SYNC) 644 of receiver 640 synchronizes the clock signal PCKR to the locally generated clock signal, PCK, in order to capture the bits received from the XPBus into PCK clock timing.

Serial to parallel converters 642 convert the serial bit packets received on lines PDR0 to PDR3 into parallel address/data and control bits that are sent to decoders 623 and 628 and control decoder and separate data path unit 624, respectively. Serial to parallel converter 643 receives control bit packets from control line PCNR, converts them to parallel control bits and sends the parallel control bits to control decoder & separate data path 624.

A 10× multiplier 641 receives PCKR, multiplies it by a factor of 10 and feeds a clock signal 10 times greater than PCKR into the serial to parallel converters 642 and 643. Because the bits on PDR0 to PDR3 and PCNR are transmitted at a bit rate of 10 times the PCKR rate, the serial to parallel converters 642 and 643 perform bit shifting at 10 times the PCKR rate to convert the 10 bit packets into parallel bits. It is to be noted that the rate at which bit packets are transmitted on the XPBus is the same as the PCKR rate, i.e., 66 MHz. The parallel data and control bits are thereafter sent to decoders 623 and 628 by way of the AD[3::0] in line and to control decoder & separate data path unit 624 by way of CNTL in lines, respectively.

Reset control unit 645 of HIC 600 receives the signal RESET#, which is an independent system reset signal, on the reset line RESET#. Reset control unit 645 then transmits the reset signal to the CPU CNTL & GPIO latch/driver unit 690.

As may be noted from the above, the 32 line host and secondary PCI buses are interfaced by 10 XPBus lines (PD0, PD1, PD2, PD3, PCN, PDR0, PDR1, PDR2, PDR3, PCNR). Therefore, the interface channel, XPBus, of the present invention uses fewer lines than are contained in either of the buses which it interfaces, namely the PCI buses. XPBus is able to interface such PCI buses without backup delays because the XPBus operates at a clock rate and a per line (channel) bit rate that are higher than those of the PCI buses.

In addition to receiving a reset signal, the CPU CNTL & GPIO latch/driver 690 is responsible for latching input signals from the CPU and north bridge and sending the signals to the translator. It also takes decoded signals from the control decoder & separate data path unit 624 and drives the appropriate signals for the CPU and north bridge.

In the embodiment shown in FIG. 6, video serial to parallel converter 680 is included in HIC 600. In another embodiment, video serial to parallel converter 680 may be a separate unit from the HIC 600. Video serial to parallel converter 680 receives serial video data on line VPD and a video clock signal VPCK from line VPCK of video bus 681. It then converts the serial video data into 16 bit parallel video port data and the appropriate video port control signals, which it transmits to the graphics controller (not shown in FIG. 6) on the video port data [0::15] and video port control lines, respectively.

HIC 600 handles the PCI bus control signals and control bits from the XPBus representing PCI control signals in the following ways:

1. HIC 600 buffers clocked control signals from the host PCI bus, encodes them into control bits and sends the encoded control bits to the XPBus;
2. HIC 600 manages the signal locally; and
3. HIC 600 receives control bits from XPBus, translates the control bits into PCI control signals and sends the PCI control signals to the host PCI bus.

In the default state, the HIC 600 acts as a target on the host PCI bus. FIG. 7 is a table showing how different PCI control signals are managed in the case where HIC 600 is a target on the host PCI bus. However, sometimes, HIC 600 acts as the master on the host PCI bus. FIG. 8 is a table showing how different PCI control signals are managed when HIC 600 is a master on the host PCI bus. In FIGS. 7 and 8, A/C and D/BE are acronyms for address/command and data/byte enable, respectively, and S. Bus is short hand for secondary bus. The reset signal RST is described as an independent signal because it is asynchronous with and independent of other clocks in the system.

In both FIGS. 7 and 8, a number of control signals have a corresponding entry in either the HIC to XPBus or the XPBus to HIC column but not in both. This is because these signals are controlled by one of either the target or the master on the bus, but not both. On the other hand, control signals with entries in both the HIC to XPBus and XPBus to HIC columns are controlled by both the target and the master on the bus. The parity signal PAR is sent from the initiator on the primary PCI Bus one cycle later than the address or data bits. In order to avoid delay in data transmission, the appropriate PAR bit is also generated by the HIC and sent as a control bit in the same clock cycle as the data bits with which the PAR bit is associated. The reset signal RST is sent on a dedicated reset line, RESET#, and, therefore, does not need to be encoded.

When HIC 600 receives a control signal from the host PCI bus that it must transmit to the XPBus, it samples the control signal on the rising edge of the PCI clock, encodes the control signal into a predesignated control bit and transmits that control bit on either one of the data lines PD0 to PD3 or the control line PCN of the XPBus. For example, FRAME# and IRDY# are encoded into bus status bit 1 (BS1) and bus status bit 0 (BS0), respectively. Other control signals, including other PCI control signals, CPU control signals, and north bridge signals, are similarly encoded into the desired predesignated control bits. Control bits are assigned to each of these signals such that each signal can be identified by its corresponding control bits.

Conversely when HIC 600 receives a bit from the XPBus that represents a control signal, it decodes the bit into the predesignated control signal, which may be a PCI control signal, a CPU control signal or a north bridge signal, and sends the control signal to the appropriate destination.

Managing control signals locally involves generating the appropriate PCI control signal when communicating with the host PCI bus or generating the appropriate encoded control bit when communicating with the XPBus. For example, when HIC 600 is a target and must send a target ready signal to the host PCI bus, i.e., send a TRDY# signal, HIC locally generates a TRDY# signal meeting PCI protocols and sends the TRDY# signal to the host PCI bus. Similarly, in the case where HIC 600 needs to send a target ready signal to the XPBus it generates the appropriate control bit corresponding to TRDY# and transmits that control bit to the XPBus. Thus, when communicating with the host PCI bus or the XPBus as a target, HIC 600 locally generates a PCI control signal or a control bit, respectively, and sends that signal to the intended recipient.

In addition to the PCI control signals, CPU, north bridge and south bridge signals, including CPU control signals, are also transmitted on the XPBus. The CPU, north bridge and south bridge signals are translated into bits that are transmitted on the XPBus. Different CPUs may have different CPU signals. Accordingly, the type of CPU is taken into consideration in assigning control bits to a CPU signal such that CPU signals of different CPUs are uniquely identified by their corresponding control bits.

Figure 9:
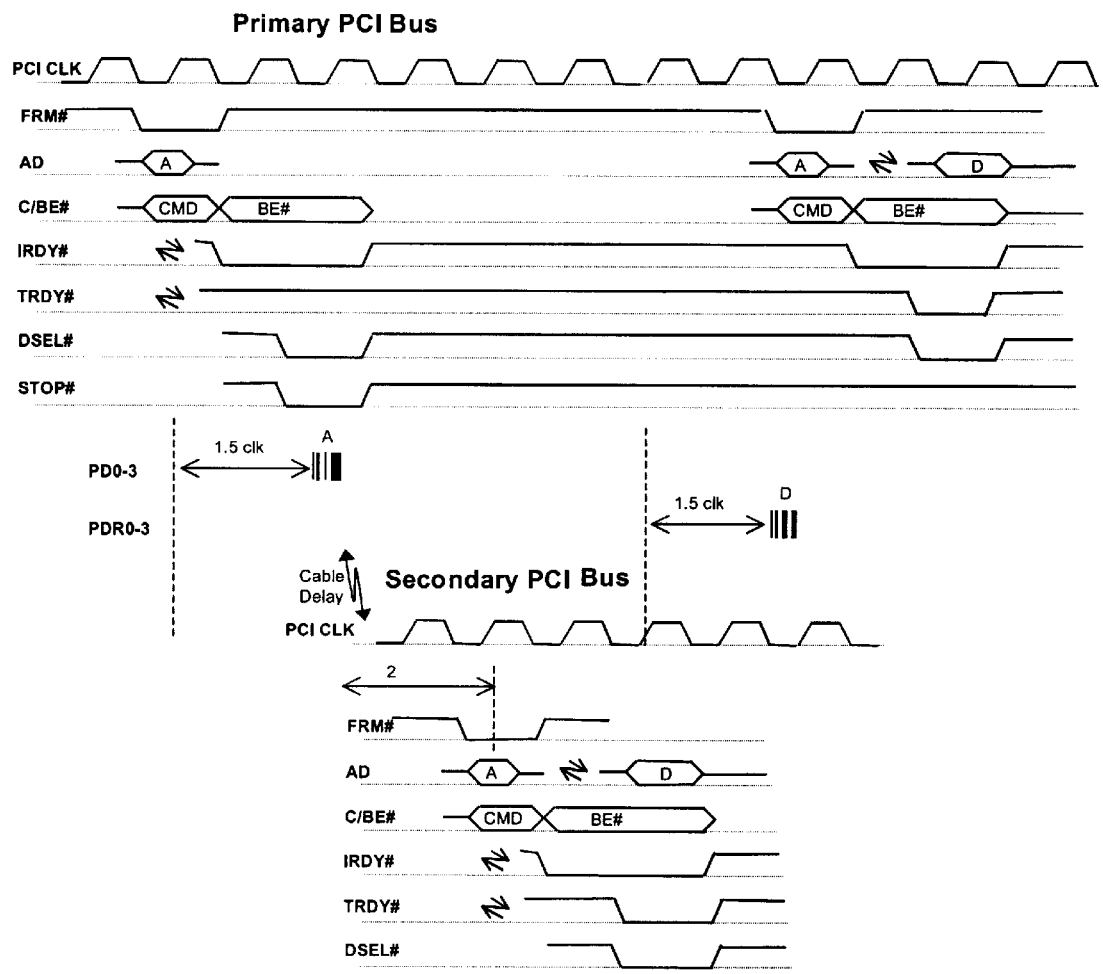
FIG. 9 is a timing diagram of a PCI memory read cycle with the HIC as a target.

FIG. 9 is a timing diagram of a PCI memory read cycle with the HIC as a target. A memory read on the primary PCI bus is buffered by the HIC as delayed read forwarding. As a delay transaction, the HIC asserts DEVSEL# and STOP# at the same time to request a retry. The HIC encodes and forwards the read transaction through the XPBus to the PIC for processing. After some cable delay, the PIC receives an encoded bit packet representing the read transaction, decodes the bit packet into read transaction PCI signals, and resynchronizes and completes the read transaction on the secondary PCI bus. Thereafter, the PIC receives data, encodes the received data and sends it back to the HIC through the XPBus. When the initiator repeats the read operation on the primary PCI bus and the data is ready in the HIC, the read operation is completed. In the example shown in FIG. 9, the primary PCI bus transaction takes a four clock cycle delay to bridge to the secondary PCI bus.

Figure 10:
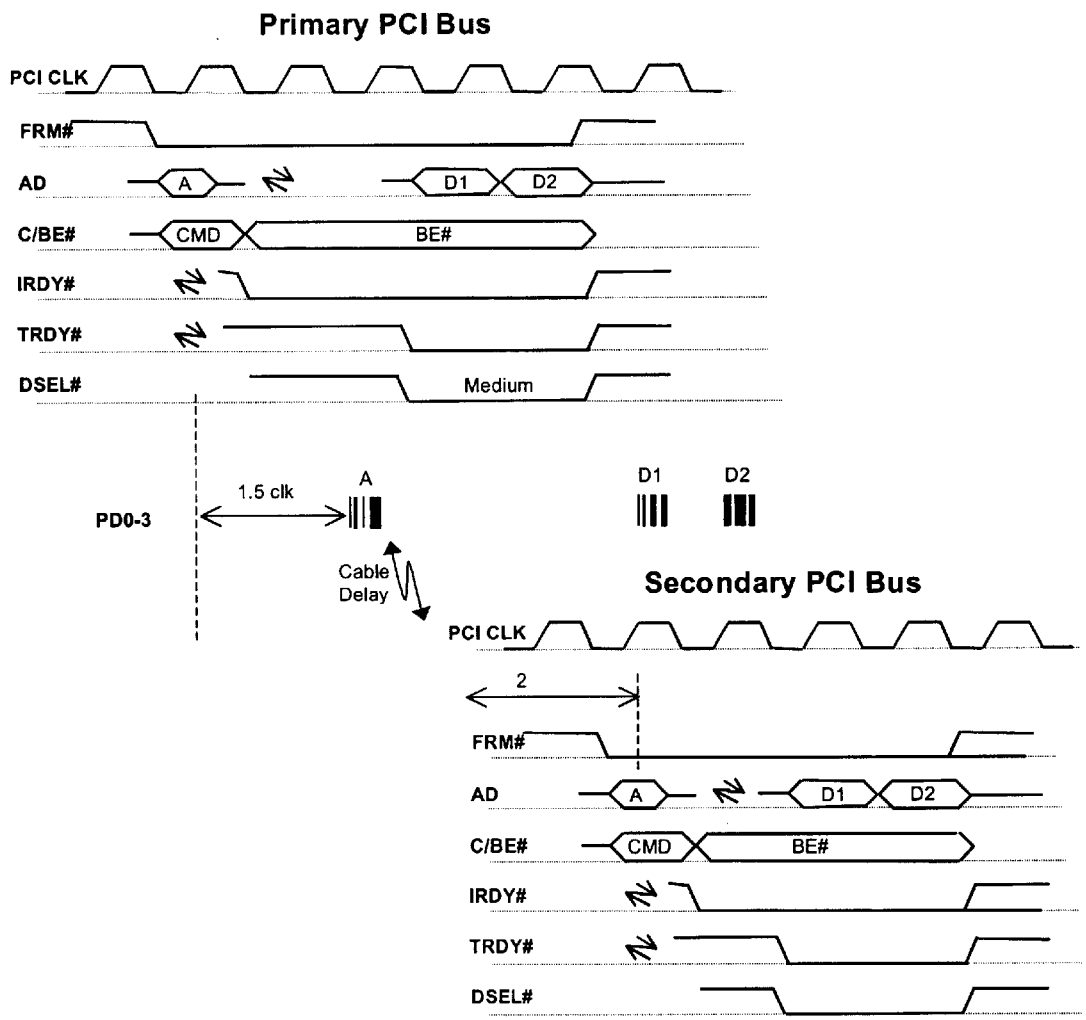
FIG. 10 is a timing diagram of a PCI memory write cycle with the HIC as a target.

FIG. 10 is a timing diagram of a PCI memory write cycle with the HIC as a target. A memory write on the primary PCI bus is buffered by the HIC as posted forwarding. Provided that the address and data buffers are not full, the HIC asserts DEVSEL#, with medium timing, and TRDY# at the same time. The TRDY# response may be asserted by the HIC in the fast mode. The HIC supports positive decoding with medium response time for the DEVSEL#. The HIC encodes and forwards the write transaction through the XPBus to the PIC for processing. After some cable delay, the PIC receives an encoded bit packet representing the write transaction, decodes the bit packet into a write transaction PCI signals, and resynchronizes and completes the delayed write transaction on the secondary PCI bus.

Figure 11:
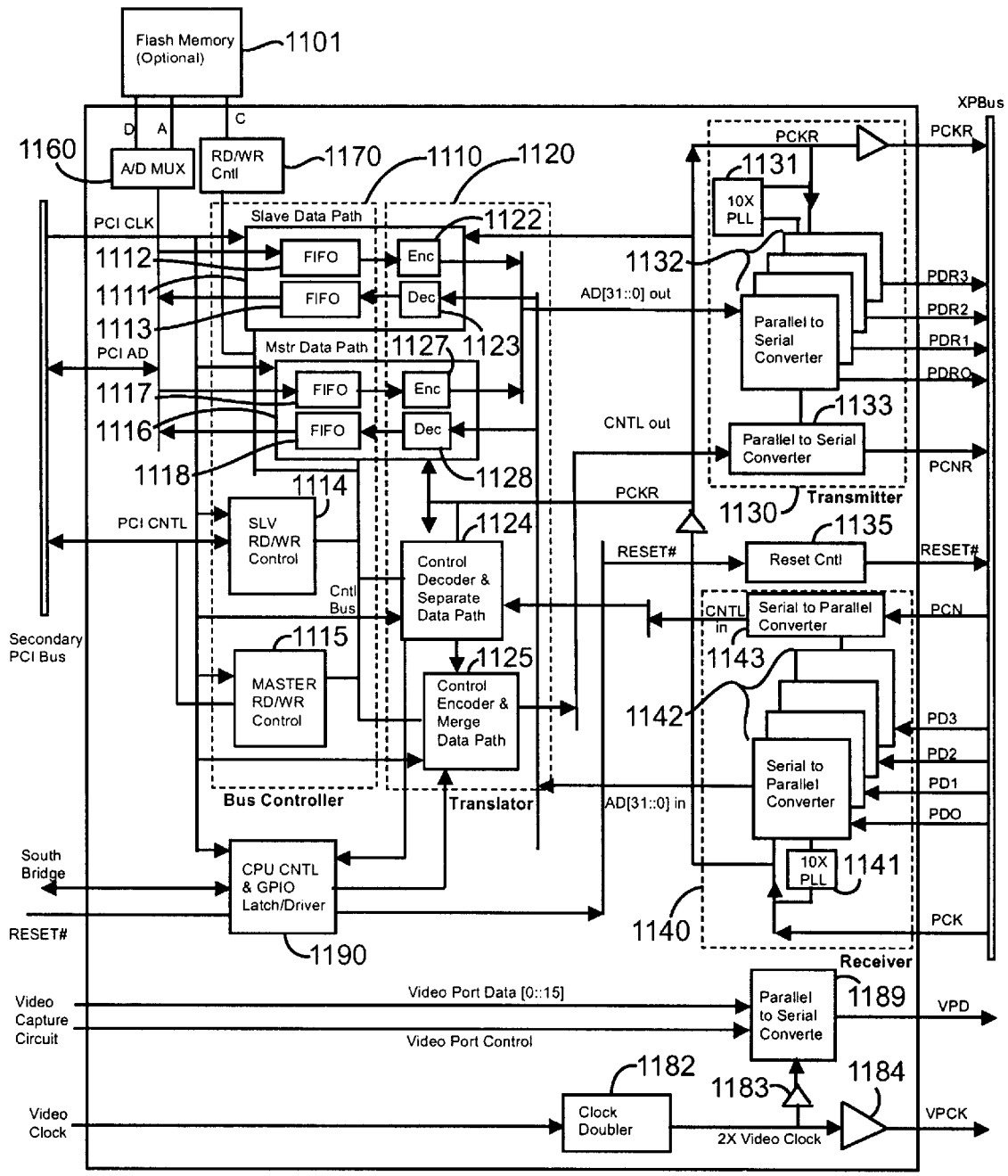
FIG. 11 is a detailed block diagram of one embodiment of the PIC of the present invention.

FIG. 11 is a detailed block diagram of one embodiment of the PIC of the present invention. PIC 1100 is nearly identical to HIC 600 in its function, except that HIC 600 interfaces the host PCI bus to the XPBus while PIC 1100 interfaces the secondary PCI bus to the XPBus. Similarly, the components in PIC 1100 serve the same function as their corresponding components in HIC 600. Reference numbers for components in PIC 1100 have been selected such that a component in PIC 1100 and its corresponding component in HIC 600 have reference numbers that differ by 500 and have the same two least significant digits. Thus for example, the bus controller in PIC 1100 is referenced as bus controller 1110 while the bus controller in HIC 600 is referenced as bus controller 610. As many of the elements in PIC 1100 serve the same functions as those served by their corresponding elements in HIC 600 and as the functions of the corresponding elements in HIC 600 have been described in detail above, the function of elements of PIC 1100 having corresponding elements in HIC 600 will not be further described herein. Reference may be made to the above description of FIG. 6 for an understanding of the functions of the elements of PIC 1100 having corresponding elements in HIC 600.

As suggested above, there are also differences between HIC 600 and PIC 1100. Some of the differences between HIC 600 and PIC 1100 include the following. First, receiver 1140 in PIC 1100, unlike receiver 640 in HIC 600, does not contain a synchronization unit. As mentioned above, the synchronization unit in HIC 600 synchronizes the PCKR clock to the PCK clock locally generated by PLL 650. PIC 1100 does not locally generate a PCK clock and therefore, it does not have a locally generated PCK clock with which to synchronize the PCK clock signal that it receives from HIC 600. Another difference between PIC 1100 and HIC 600 is the fact that PIC 1100 contains a video parallel to serial converter 1189 whereas HIC 600 contains a video serial to parallel converter 680. Video parallel to serial converter 1189 receives 16 bit parallel video capture data and video control signals on the Video Port Data [0::15] and Video Port Control lines, respectively, from the video capture circuit (not shown in FIG. 11) and converts them to a serial video data stream that is transmitted on the VPD line to the HIC. The video capture circuit may be any type of video capture circuit that outputs a 16 bit parallel video capture data and video control signals. Another difference lies in the fact that PIC 1100, unlike HIC 600, contains a clock doubler 1182 to double the video clock rate of the video clock signal that it receives. The doubled video clock rate is fed into video parallel to serial converter 1182 through buffer 1183 and is sent to serial to parallel converter 680 through buffer 1184. Additionally, reset control unit 1135 in PIC 1100 receives a reset signal from the CPU CNTL & GPIO latch/driver unit 1190 and transmits the reset signal on the RESET# line to the HIC 600 whereas reset control unit 645 of HIC 600 receives the reset signal and forwards it to its CPU CNTL & GPIO latch/driver unit 690 because, in the above embodiment, the reset signal RESET# is unidirectionally sent from the PIC 1100 to the HIC 600.

Like HIC 600, PIC 1100 handles the PCI bus control signals and control bits from the XPBus representing PCI control signals in the following ways:

1. PIC 1100 buffers clocked control signals from the secondary PCI bus, encodes them and sends the encoded control bits to the XPBus;
2. PIC 1100 manages the signal locally; and
3. PIC 1100 receives control bits from XPBus, translates them into PCI control signals and sends the PCI control signals to the secondary PCI bus.

PIC 1100 also supports a reference arbiter on the secondary PCI Bus to manage the PCI signals REQ# and GNT#.

FIGS. 12 and 13 are tables showing how PCI control signals are managed in the cases when PIC 600 is a target and master (a default condition), respectively, on the secondary PCI bus.

Figure 14:
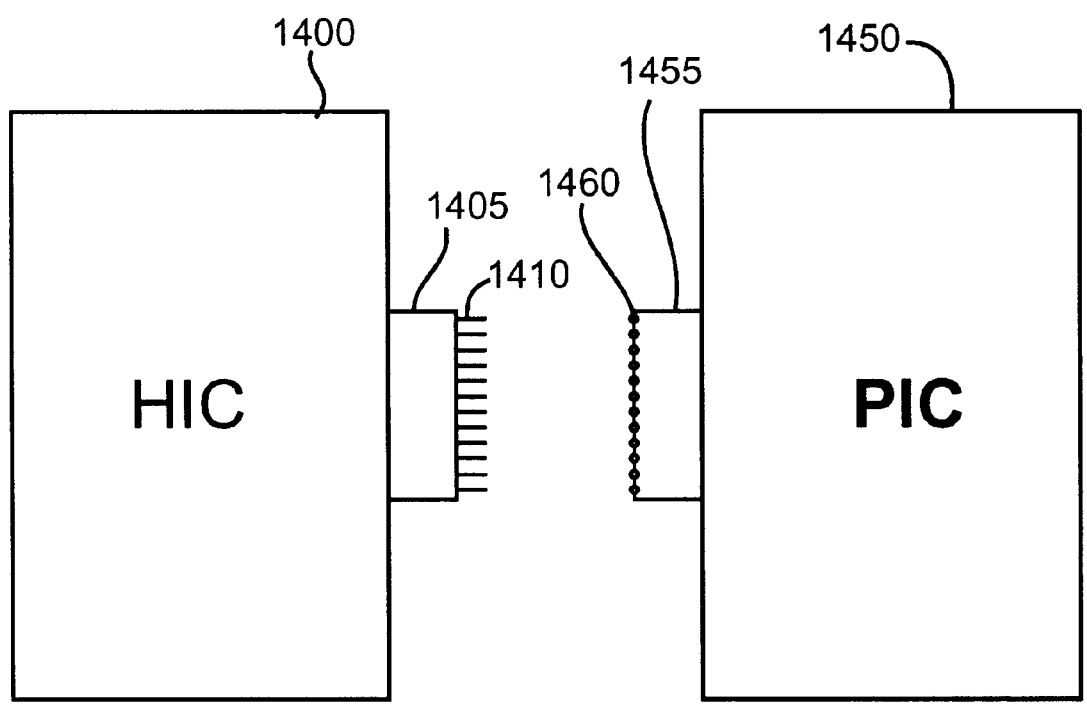
FIG. 14 shows a schematic diagram of one embodiment of the connectors used to couple the HIC and PIC.

FIG. 14 shows a schematic diagram of the connectors used to couple the HIC and PIC of the present invention. HIC 1400 has a male connector 1405 with pins 1410 while PIC 1450 has a female connector 1455 with pinholes 1460 for accepting pins 1410 when connectors 1405 and 1455 are engaged. In a preferred embodiment, the male and female connectors 1405 and 1455 are designed to withstand numerous engagements and disengagements. In that respect, the connectors preferably comply with industry standard drive bay connector specifications. Note that although FIG. 14 shows HIC 1400 and PIC 1450 with a male connector and a female connector, respectively, in another embodiment, HIC 1400 and PIC 1450 may have a female connector and a male connector, respectively.

In the embodiment shown in FIG. 14, the connectors on the HIC and PIC engage with one another directly. However, in another embodiment, such as that shown in FIG. 15, the connectors on the HIC and PIC do not directly engage with one another. In the embodiment shown in FIG. 15, an extension cord 1580 having cable 1583 and connectors 1581 and 1582 disposed at the ends of cable 1583, is used to couple the connectors 1505 and 1555 on the HIC 1500 and PIC 1550, respectively.

Figure 15:
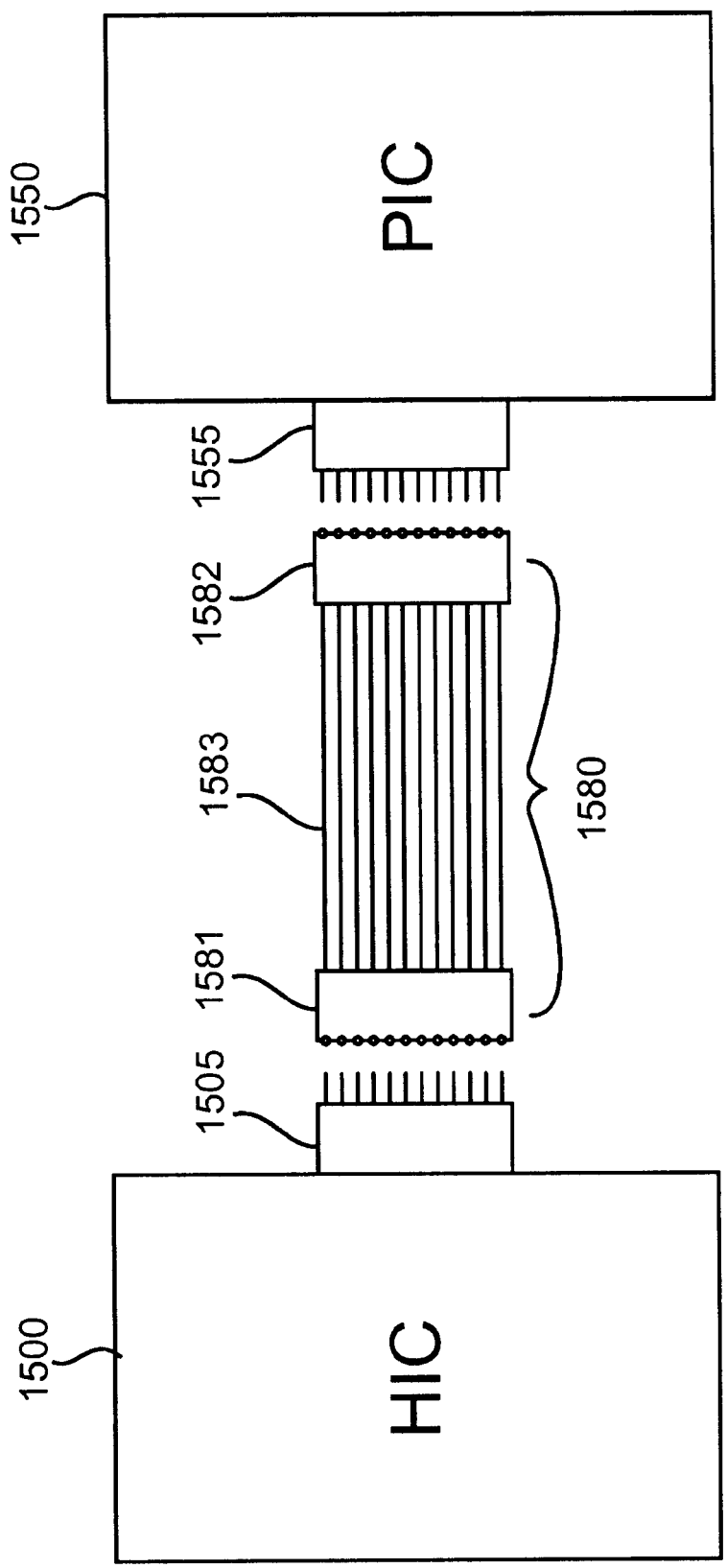
FIG. 15 is a schematic diagram of another embodiment of the connectors used to couple the HIC and PIC.

The interfaces of the present invention comprising an HIC, a PIC and the link between the HIC and PIC, either with or without an extension cord such as extension cord 1580 in FIG. 15, may be used to interface an ACM and a peripheral console. Moreover, the embodiment of the interface of the present invention having an extension cord, such as that disclosed in FIG. 15, may be used to interface two computer systems. Therefore, the interface of the present invention has broader application than that of interfacing an ACM and a peripheral console.

In one embodiment, the connectors may be limited to pins for transmitting PCI related signals. In such an embodiment, the cable would consist of conductive lines on the XPBus. In another embodiment, however, the connectors may include pins for transmitting video and/or power related signals in addition to the PCI related signals, in which case, the cable would have conductive lines for the video bus and/or power bus.

Figure 16:
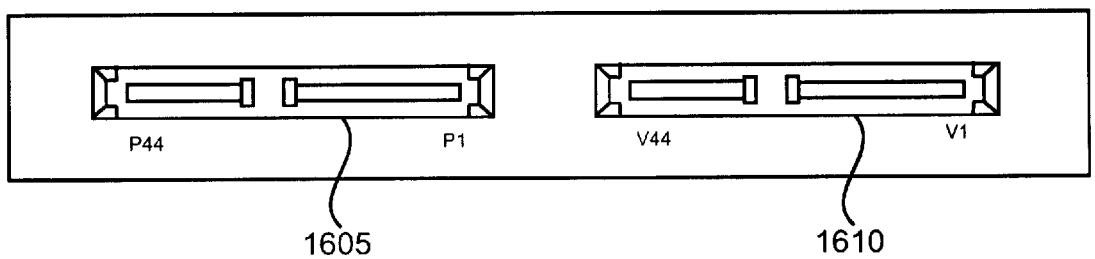
FIG. 16 is a schematic diagram of the rear view of an ACM showing a peripheral connector and a video connector.

FIG. 16 is a schematic diagram of the rear view of an ACM showing both peripheral connector 1605 and video connector 1610. The peripheral connector 1605 provides peripheral signals whereas the video connector 1610 provides video signals. Power lines are provided within both the peripheral connector 1605 and the video connector 1610.

FIG. 17 shows a schematic diagram of the pin out of peripheral connector 1605 and video connector 1610. Pins for lines PD0 to PD3, PCK and PCN are on the same side of the connector. Similarly, the pins for lines PDR0 to PDR3, PCKR and PCNR are all on the same side of the connector. Lines transmitting information in the same direction are placed on the same side of the connector in order to match delay between these related lines and to avoid slew.

FIGS. 18 and 19 are tables including the pin number, symbol, signal, standard and description for the pins on the peripheral and video connectors, respectively. FIG. 20 is a table showing the symbols, signals, data rate and description of signals on the XPBus, where RTN indicates a ground (GND) reference. In the above tables, P&D stands for plug and display and is a trademark of the Video Electronics Standards Association (VESA) for the Plug and Display standard, DDC2:SCL and DDC2:SDA stand for the VESA display data channel (DDC) standard 2 clock and data signals, respectively, SV stands for super video, V33 is 3.3 volts, and V5 is 5.0 volts. TMDS stands for Transition Minimized Differential Signaling and is a trademark of Silicon Images and refers to their Panel Link technology, which is in turn a trademark for their LVDS technology. TMDS is used herein to refer to the Panel Link technology or technologies compatible therewith.

The video connector 1610 provides 3 types of video output, DDC2 support, video port, 6 pins of 3.3 volt power, and 14 pins for ground. The 3 types of video output include (1) analog RGB (Red Green Blue) for a color monitor, (2) VESA Plug and Display's TMDS signals for flat panel displays, and (3) signals for TV and S-video (super video). In one embodiment, the video port is supported with two LVDS lines, namely VPCK and VPD, which are used for video clock and video data, respectively.

FIG. 21 is a table showing the information transmitted on the XPBus during two clock cycles of the XPBus in one embodiment of the present invention where 10 data bits are transmitted in each clock cycle of the XPBus. In FIG. 21, A00 to A31 represent 32 bits of PCI address A[31::0], D00 to D31 represent 32 bits of PCI data D[31::0], BS0 to BS3 represent 4 bits of bus status data indicating the status of the XPBus, CM0# to CM3# represent 4 bits of PCI command information, BE0# to BE3# represent 4 bits of PCI byte enable information, and CN0 to CN9 represent 10 bits of control information sent in each clock cycle. As shown in FIG. 21, for each of lines PD0 to PD3, the 10 bit data packets contain one BS bit, one CM/BE bit, and eight A/D bits. For the PCN line, the 10 bit data packet contains 10 CN bits. The first clock cycle shown in FIG. 21 comprises an address cycle in which 4 BS bits, 4 CM bits, 32 A bits and 10 CN bits are sent. The second clock cycle comprises a data cycle in which 4 BS bits, 4 BE bits, 32 D bits and 10 CN bits are sent. The bits transmitted on lines PD0 to PD3 represent 32 PCI AD[31::0] signals, 4 PCI C/BE# [3::0] signals, and part of the function of PCI control signals, such as FRAME#, IRDY#, and TRDY#.

In the embodiment shown in FIG. 21, BS0 to BS3 are sent at the beginning of each clock cycle. The bus status bits indicate the following bus cycle transactions: idle, address transfer, write data transfer, read data transfer, switch XPBus direction, last data transfer, wait, and other cycles.

Bits representing signals transmitted between the CPU and South Bridge may also be sent on the lines interconnecting the HIC and PIC, such as lines PCN and PCNR. For example, CPU interface signals such as CPU interrupt (INTR), Address 20 Mask (A20M#), Non-Maskable Interrupt (NMI), System Management Interrupt (SMI#), and Stop Clock (STPCLK#), may be translated into bit information and transmitted on the XPBus between the HIC and the PIC.

Figure 22:
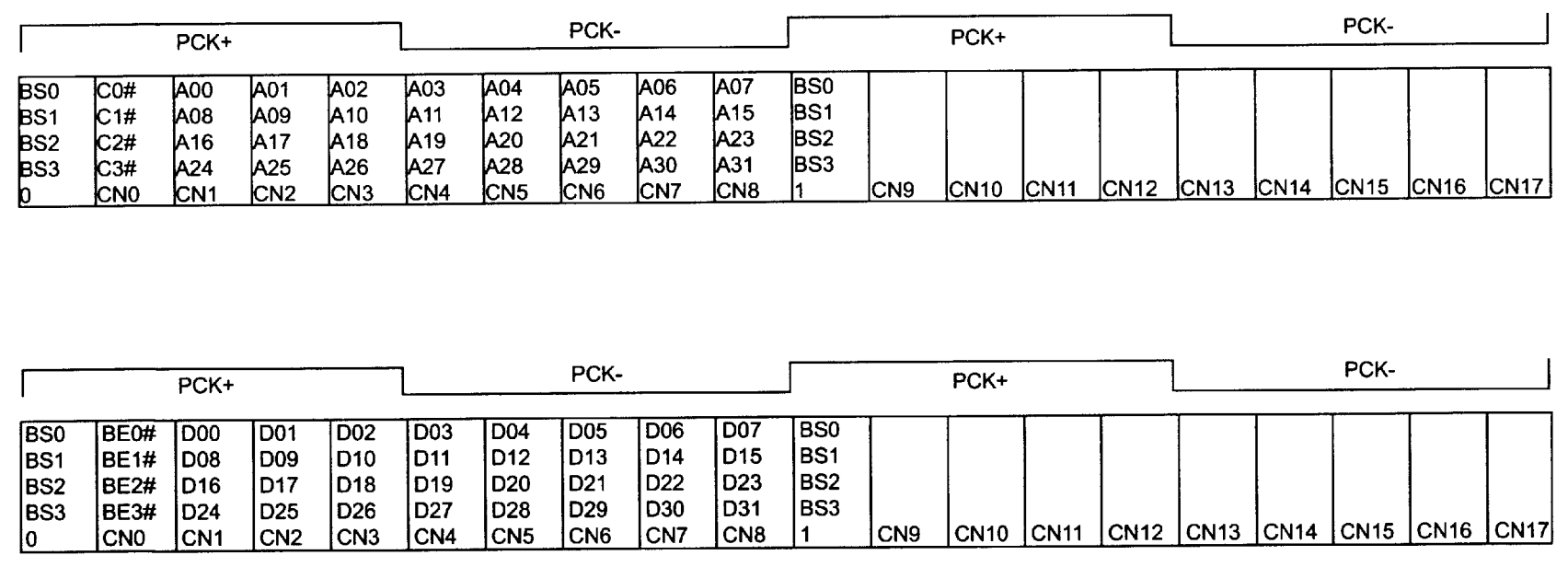

FIG. 22 is a table showing the information transmitted on the XPBus during four clock cycles of the XPBus in another embodiment of the present invention where 10 data bits are transmitted in each clock cycle of the XPBus. In this embodiment, the XPBus clock rate is twice as large as the PCI clock rate. This allows sending data and address bits every other XPBus cycle. As can be seen in FIG. 22, there are no address or data bits transmitted during the second or fourth XPBus clock cycle. The fact that the XPBus clock rate is higher than the PCI clock rate allows for compatibility of the XPBus with possible future expansions in the performance of PCI bus to higher data transfer and clock rates.

In the embodiment shown in FIG. 22, there are 18 control bits, CN0 to CN17, transmitted in every two XPBus clock cycles. The first bit transmitted on the control line in each XPBus clock cycle indicates whether control bits CN0 to CN8 or control bits CN9 to CN17 will be transmitted in that cycle. A zero sent at the beginning of a cycle on the control line indicates that CN0 to CN8 will be transmitted during that cycle, whereas a one sent at the beginning of a cycle on the control line indicates that CN9 to CN17 will be transmitted during that cycle. These bits also indicate the presence or absence of data and address bits during that cycle. A zero indicates that address or data bits will be transmitted during that cycle whereas a one indicates that no address or data bits will be transmitted during that cycle.

In one embodiment, BS0 and BS1 are used to encode the PCI signals FRAME# and IRDY#, respectively.

Additionally, in one embodiment, BS2 and BS3 are used to indicate the clock speed of the computer bus interface and the type of computer bus interface, respectively. For example, BS2 value of zero may indicate that a 33 MHz PCI bus of 32 bits is used whereas a BS2 value of one may indicate that a 66 MHz PCI bus of 32 bits is used. Similarly, a BS3 value of zero may indicated that a PCI bus is used whereas a BS3 value of one may indicated that another computer interface bus, such as an Institute of Electronics & Electrical Engineers (IEEE) 1394 bus, is used.

Figure 23:
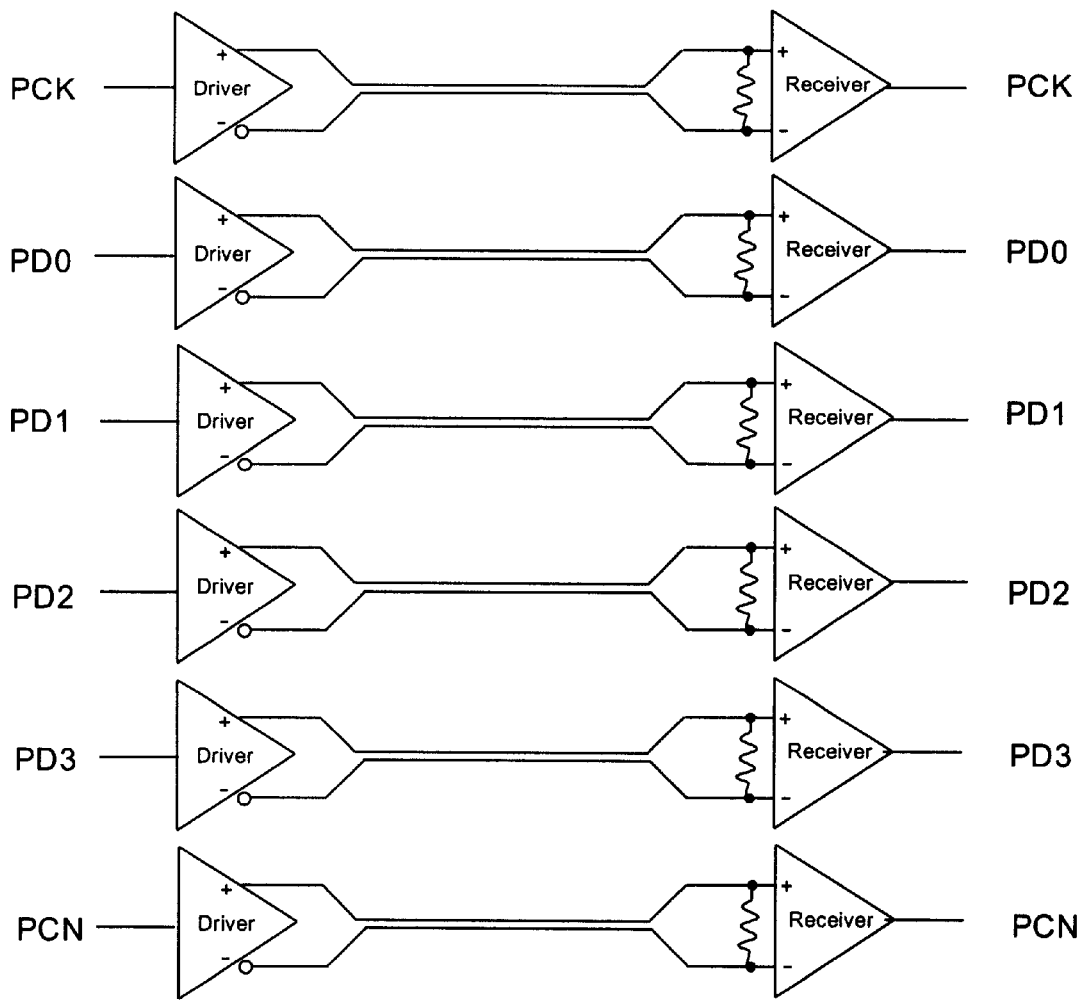
FIG. 23 is a schematic diagram of the signal lines PCK, PD0 to PD3, and PCN.

FIG. 23 is a schematic diagram of lines PCK, PD0 to PD3, and PCN. These lines are unidirectional LVDS lines for transmitting clock signals and bits such as those shown in FIGS. 21 and 22 from the HIC to the PIC. The bits on the PD0 to PD3 and the PCN lines are sent synchronously within every clock cycle of the PCK. Another set of lines, namely PCKR, PDR0 to PDR3, and PCNR, are used to transmit clock signals and bits from the PIC to HIC. The lines used for transmitting information from the PIC to the HIC have the same structure as those shown in FIG. 23, except that they transmit data in a direction opposite to that in which the lines shown in FIG. 23 transmit data. In other words they transmit information from the PIC to the HIC. The bits on the PDR0 to PDR3 and the PCNR lines are sent synchronously within every clock cycle of the PCKR. Some of the examples of control information that may be sent in the reverse direction, i.e., on PCNR line, include a request to switch data bus direction because of a pending operation (such as read data available), a control signal change in the target requiring communication in the reverse direction, target busy, and transmission error detected.

The XPBus which includes lines PCK, PD0 to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.

The XPBus lines, PD0 to PD3, PCN, PDR0 to PDR3 and PCNR, and the video data and clock lines, VPD and VPCK, are not limited to being LVDS lines, as they may be other forms of bit based lines. For example, in another embodiment, the XPBus lines may be IEEE 1394 lines.

It is to be noted that although each of the lines PCK, PD0 to PD3, PCN, PCKR, PDR0 to PDR3, PCNR, VPCK, and VPD is referred to as a line, in the singular rather than plural, each such line may contain more than one physical line. For example, in the embodiment shown in FIG. 23, each of lines PCK, PD0 to PD3 and PCN includes two physical lines between each driver and its corresponding receiver. The term line, when not directly preceded by the terms physical or conductive, is herein used interchangeably with a signal or bit channel which may consist of one or more physical lines for transmitting a signal. In the case of non-differential signal lines, generally only one physical line is used to transmit one signal. However, in the case of differential signal lines, a pair of physical lines is used to transmit one signal. For example, a bit line or bit channel in an LVDS or IEEE 1394 interface consists of a pair of physical lines which together transmit a signal.

A bit based line (i.e., a bit line) is a line for transmitting serial bits. Bit based lines typically transmit bit packets and use a serial data packet protocol. Examples of bit lines include an LVDS line, an IEEE 1394 line, and a Universal Serial Bus (USB) line.

Figure 24:
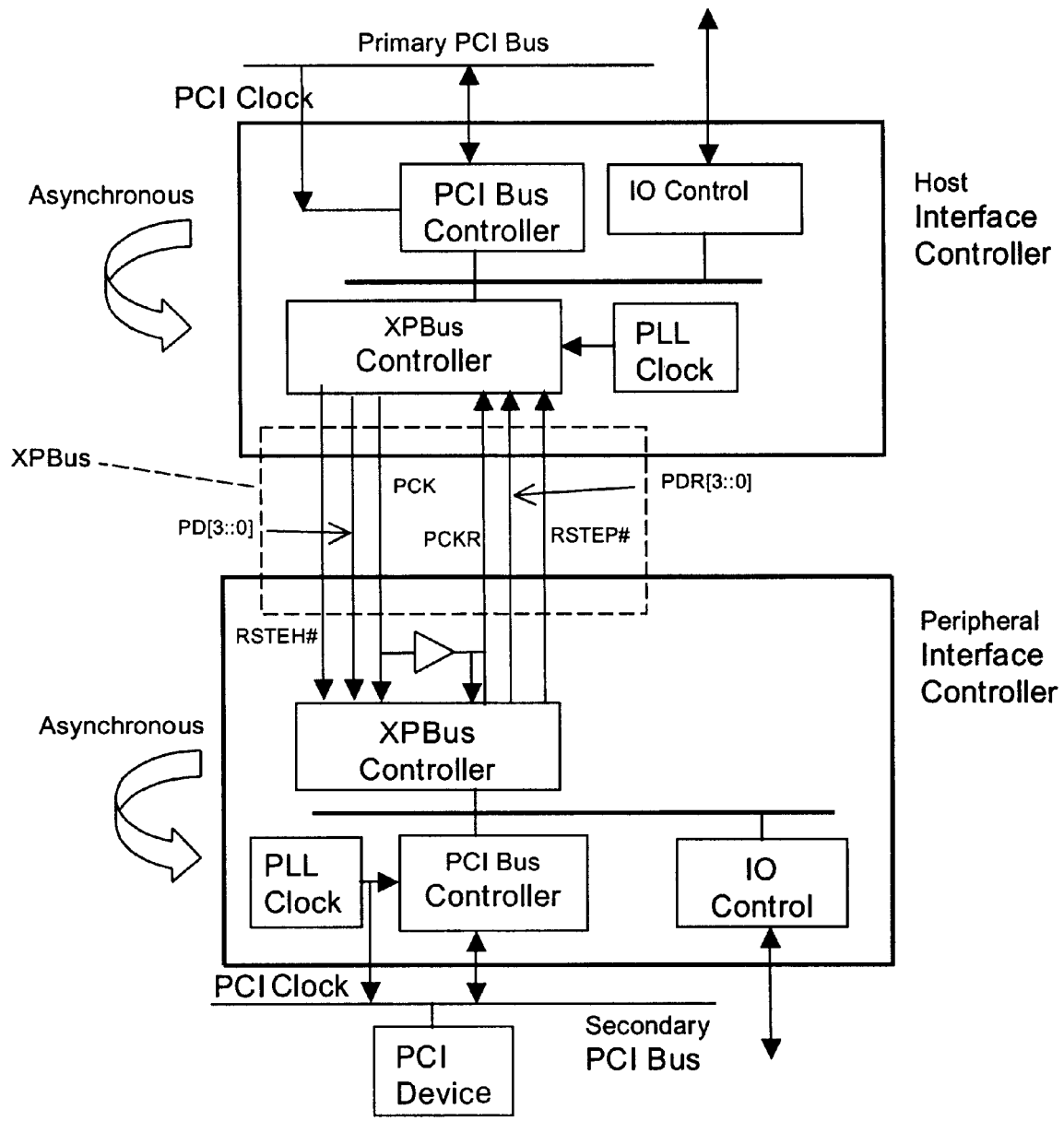
FIG. 24 is a block diagram of another embodiment of the HIC and PIC of the present invention and the interface therebetween.

FIG. 24 is a block diagram of another embodiment of the HIC and PIC of the present invention and the interface therebetween. One important difference between the XPBuses shown in FIGS. 5 and 24 is the fact that unlike the XPBus of FIG. 5, the XPBus of FIG. 24 does not have control lines PCN and PCNR. Another difference lies in the fact that the XPBus of FIG. 24 has two dedicated reset lines RSTEH# and RSTEP# instead of only one as is the case for the XPBus of FIG. 5. RSTEH# and RSTEP# are unidirectional reset and error condition signal lines that transmit a reset and error condition signal from the host PCI to the peripheral PCI and from the peripheral PCI to host PCI, respectively.

In one embodiment, each of reset lines RSTEH#, RSTEP#, and RESET# (shown in FIG. 5), is preferably a non-differential signal line consisting of one physical line. In other embodiments, one or more of the above lines may be a differential signal line having more than one physical line.

Figure 25:
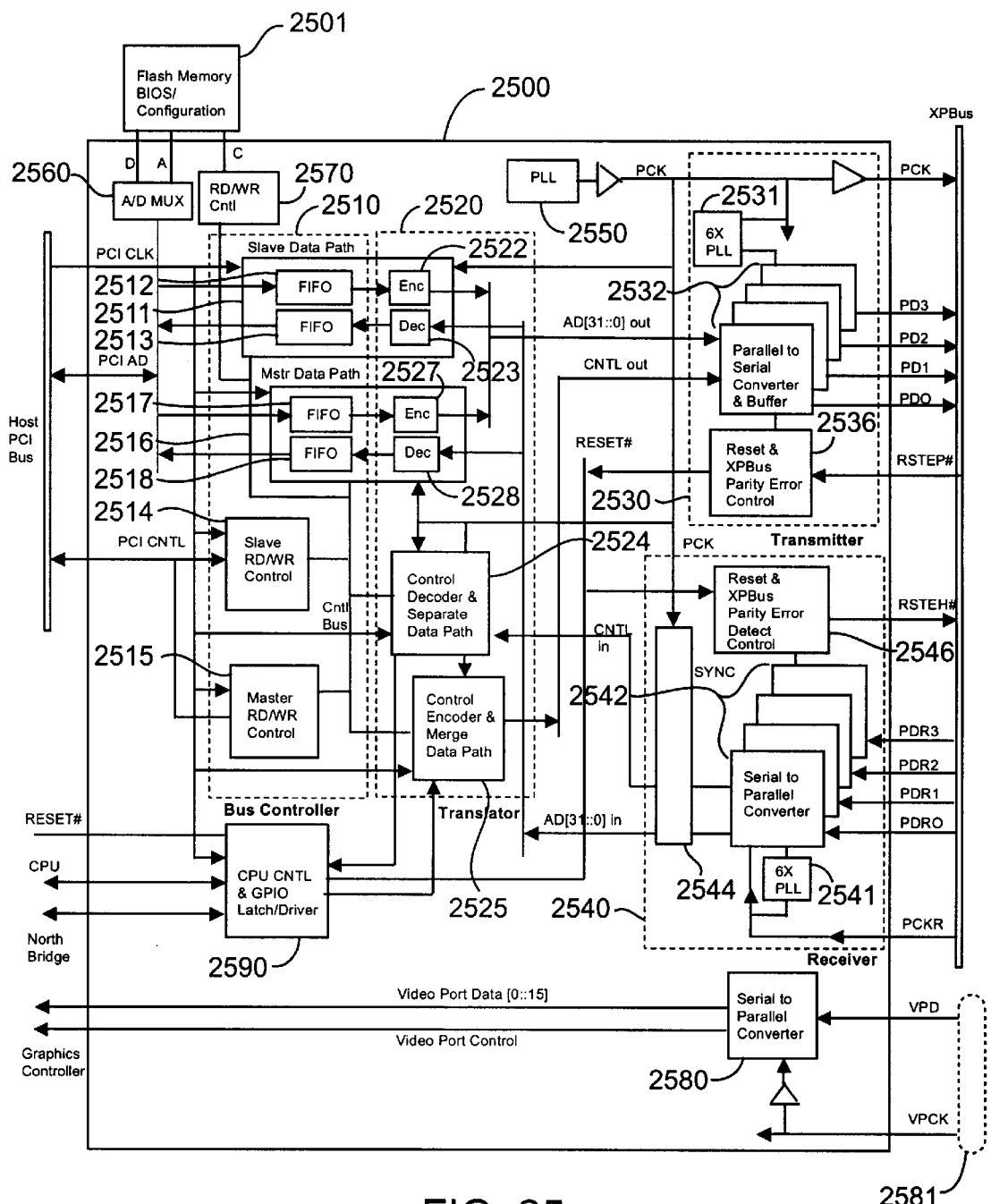
FIG. 25 is a detailed block diagram of another embodiment of the HIC of the present invention.

FIG. 25 shows a detailed block diagrams of the HIC shown in FIG. 24. HIC 2500 shown in FIG. 25 is, other than for a few difference, identical to HIC 600 shown in FIG. 6. Accordingly, reference numbers for components in HIC 2500 have been selected such that a component in HIC 2500 and its corresponding component in HIC 600 have reference numbers that differ by 1900 and have the same two least significant digits. One of the differences between HIC 2500 and HIC 600 is the fact that, unlike HIC 600, HIC 2500 does not have a parallel to serial converter or a serial to parallel converter dedicated exclusively to CNTL out and CNTL in signals, respectively. This is due to the fact that XPBus for HIC 2500 does not contain a PCN or PCNR line. Another important difference between HIC 2500 and HIC 600 is the fact that HIC 2500, unlike HIC 600, has two reset lines, RSTEP# and RSTEH#, instead of only one reset line. Reset line RSTEP# is coupled to Reset & XPBus Parity Error Control Unit 2536 which receives, on the reset line RSTEP#, a reset signal and a parity error signal generated by the PIC, sends a reset signal to the CPU CNTL & GPIO latch/driver 2590, and controls retransmission of bits from the parallel to serial converters 2532. Reset & XPBus Parity Error Detection and Control Unit 2546 takes bits from serial to parallel converters 2542, performs a parity check to detect any transmission error, and sends reset and parity error signals to the PIC on the reset line RSTEH#. The reset and parity error signals may be distinguished by different signal patterns and/or different signal durations. In the two reset line system, the reset and error parity signals are transmitted on the same line and it is possible to send a parity error confirmation signal on one line while receiving a reset signal on the other line. Because HIC 2500 provides for parity error detection, the parallel to serial converters 2532 include buffers. The buffers in parallel to serial converters 2532 store previously transmitted bits (e.g., those transmitted within the previous two clock cycles) for retransmission if transmission error is detected and a parity error signal is received on line RSTEP#. It is to be noted that parallel to serial converters 632 do not contain buffers such as those contained in parallel to serial converters 2532 for purposes of retransmission since HIC 600 does not provide for parity error signal detection. Yet another difference between HIC 600 and HIC 2500 is the fact that in HIC 2500 clock multipliers 2531 and 2541 multiply the PCK and PCKR clocks, respectively, by a factor of 6 rather than 10 because the XPBus coupled to HIC 2500 transmits six bit packets instead of ten bit packets during each XPBus clock cycle. Sending a smaller number of bits per XPBus clock cycle provides the benefit of improving synchronization between the data latching clock output by clock multipliers 2531 and 2541 and the XPBus clocks, PCK and PCKR. In another embodiment, one may send 5 or some other number of bits per XPBus clock cycle. As mentioned above, the remaining elements in HIC 2500 are identical to those in HIC 600 and reference to the description of the elements in HIC 600 may be made to understand the function of the corresponding elements in HIC 2500.

Figure 26:
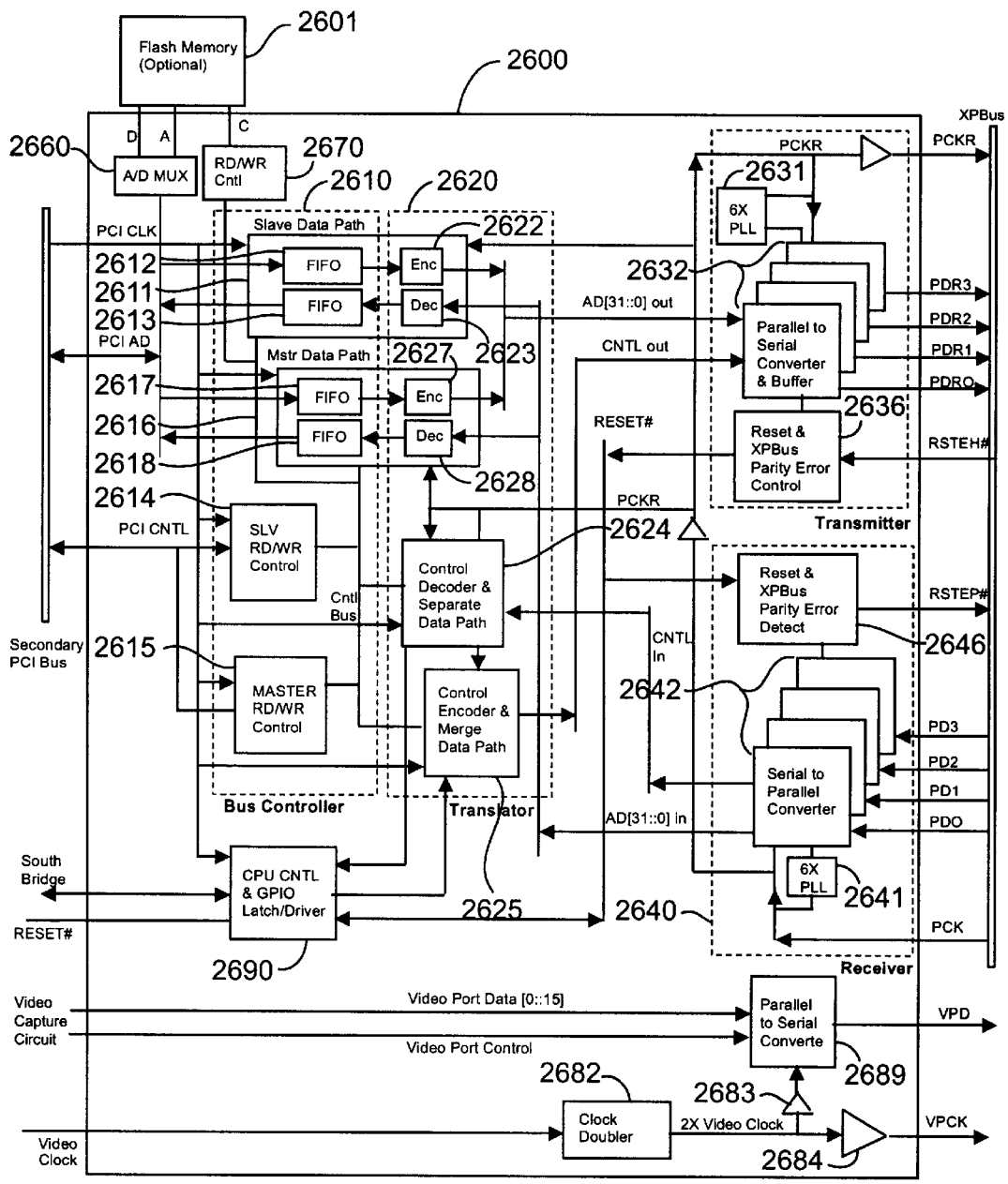
FIG. 26 is a detailed block diagram of another embodiment of the PIC of the present invention.

FIG. 26 shows a detailed block diagrams of the PIC shown in FIG. 24. PIC 2600 is, but for the differences discussed above between HICs 2500 and 600, identical to PIC 1100. Accordingly, reference numbers for components in PIC 2600 have been selected such that a component in PIC 2600 and its corresponding component in PIC 1100 have reference numbers that differ by 1500 and have the same two least significant digits. Reference may be made to (1) the description above of PIC 1100 and (2) the discussion above of the differences between HICs 600 and 2500 for a full understanding of the elements of PIC 2600. With respect to Reset & XPBus Parity Error Control Unit 2636 and Reset & XPBus Parity Error Detection & Control Unit 2646, it is to be noted that they serve the same type of functions as those performed by Reset & XPBus Parity Error Control Unit 2536 and Reset & XPBus Parity Error Detection & Control Unit 2546, respectively, except that Reset & XPBus Parity Error Control Unit 2636 receives a reset and parity error signal on reset line RSTEH# instead of RSTEP# and Reset & XPBus Parity Error Detection & Control Unit 2646 sends a reset and parity error signal on RSTEP# instead of RSTEH#.

Figure 27:
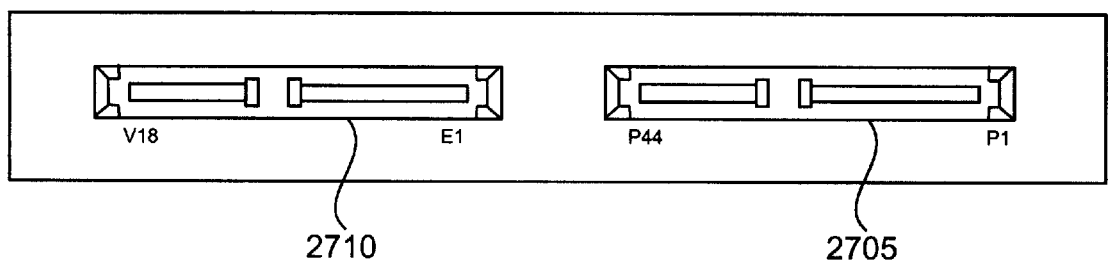
FIG. 27 is a schematic diagram of the rear view of another embodiment of the ACM showing a peripheral connector and a video/extension connector.

FIG. 27 is a schematic diagram of the rear view of an ACM using an HIC, such as HIC 2500, showing both peripheral connector 2705 and video/extension connector 2710. The peripheral connector 2705 provides peripheral signals whereas the video/extension connector 2710 provides video signals. Power lines are provided within both the peripheral connector 2705 and the video/extension connector 2710.

FIG. 28 shows a schematic diagram of the pin out of peripheral connector 2705 and video/extension connector 2710. In FIG. 28, TPA and TPB stand for twisted pair A and twisted pair B, respectively, which are both IEEE 1394 standards, V12 symbolizes 12 volts, and E pins are extension pins. In embodiments which do not use a flat panel screen or IEEE 1394 standard buses, the E pins are not necessary and may be omitted. In cases where E pins are not necessary, the pins are omitted to reduce cost on a connector or cabling that would otherwise be needed. The video/extension connector 2710 provides 3 types of video output, DDC2 support, video port, 9 pins of 3.3 volt power, 3 pins for 5 volt power, 3 pins for 12 volt power, and 9 pins for ground. The 3 types of video output include (1) analog RGB (Red Green Blue) for a color monitor, (2) VESA Plug and Display's TMDS signals for flat panel displays, and (3) signals for TV and S-video (super video). The video port is supported with two LVDS lines VPCK and VPD used for video clock and video data, respectively.

FIG. 29 is a table including the pin number, symbol, signal, standard and description for the pins on the peripheral connector. FIG. 30 is a table showing the pin number, symbol, signal, standard and description for the pins on the video/extension connector. FIG. 31 is a table showing the symbols, signals, data rate and description of signals on the XPBus.

Figure 32:
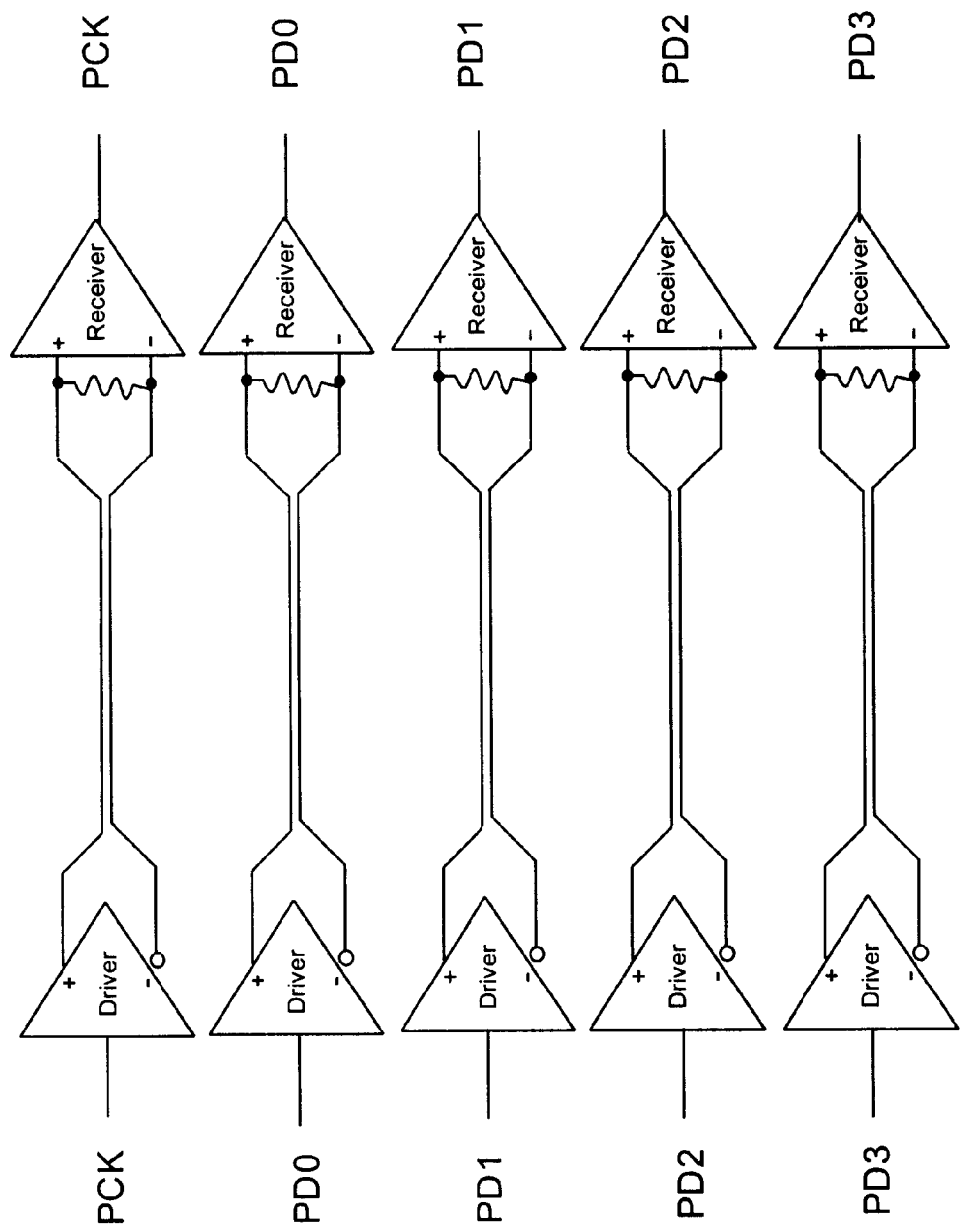
FIG. 32 is a schematic diagram of the signal lines PCK and PD0 to PD3.

FIG. 32 is a schematic diagram of the lines PCK and PD0 to PD3. These lines are unidirectional LVDS lines for transmitting signals from HIC 2500 to PIC 2600. Another set of lines, namely PCKR and PDR0 to PDR3, are used to transmit clock signals and bits from PIC 2600 to HIC 2500. The lines used for transmitting information from PIC 2600 to HIC 2400 have the same structure as those shown in FIG. 33, except that they transmit information in the opposite direction from that of those shown in FIG. 32. In other words they transmit information form the PIC to the HIC.

FIGS. 33 and 34 are tables showing the data packet types transmitted from HIC 2500 to PIC 2600 and from PIC 2600 to HIC 2500, respectively. Each data packet consists of six nibbles, a first nibble to a sixth nibble, where each nibble consists of four bits. The four bits in a nibble transmitted from the HIC to the PIC are simultaneously transmitted on lines PD0 to PD3. Similarly, the four bits in a nibble transmitted from the HIC to the PIC are simultaneously transmitted on lines PDR0 to PDR3. The first and second nibbles in each data packet carry control information while the third to sixth nibbles carry address, data and/or control information. For example, data packet type HMA1/HMD1 (host master address first segment/host master data first segment), has XX00 (where X represents an either a 0 or a 1 bit) and C/BE in the first and second nibbles, respectively, and PCI A/D first segment in the third to sixth nibbles. Similarly, data packet type HTD1 (host target data first segment) has XX00 and BE in the first and second nibbles, respectively, and PCI D first segment in the third to sixth nibbles.

Each of lines PD0 to PD3 and PDR0 to PDR3 transmits 6 bits in a clock cycle of 132 MHz. For each 32 bit address or data PCI bus transmission, two consecutive data packets are used. A total of 12 control bits, 4 C/BE bits, and 32 address/data bits are sent in the two consecutive data packets. For an address cycle, each packet includes 4 bits of Bus Status information, 4 bits of Command information, and 32 bits of address information. For a data cycle, each packet includes 4 bits of Bus Status information, 4 bits of Byte Enable information, and 32 bits of data information. The bits transmitted on lines PD0 to PD3 represent 32 PCI AD[31::0] signals, 4 PCI C/BE# [3::0] signals, and part of the function of PCI control signals, such as FRAME#, IRDY#, and TRDY#.

Since PCK and PCKR have a clock rate of 132 MHz and two clock cycles are used for transmitting the bits representing each PCI bus transmission, the XPBus transmits the bits representing each PCI bus transmission at twice the speed of a 33 MHz PCI bus. This allows for using the XPBus with future expansions to either higher performance PCI bus or other data transfer modes.

HMA1 and HMA2 stand for host master address first segment and host master address second segment, respectively; HMD1 and HMD2 stand for host master data first segment and host master data second segment, respectively; HMC1 and HMC2 stand for host master control first segment and host master control second segment, respectively; HTD1 and HTD2 stand for host target data first segment and host target data second segment, respectively; HTC1 and HTC2 stand for host target control first segment and host target control second segment, respectively; PMA1 and PMA2 stand for peripheral master address first segment and peripheral master address second segment, respectively; PMD1 and PMD2 stand for peripheral master data first segment and peripheral master data second segment, respectively; PMC1 and PMC2 stand for peripheral master control first segment and peripheral master control second segment, respectively; PTD1 and PTD2 stand for peripheral target data first segment and peripheral target data second segment, respectively; PTC 1 and PTC2 stand for peripheral target control first segment and peripheral target control second segment, respectively; Resvd stands for reserved; and NOOP stands for no-operation. HMA1/HMD1, HMA2/HMD2, HTD1, HTD2, PMA1/PMD1, PMA2/PMD2, PTD1, and PTD2 each contain PCI control information in the first and second nibbles and PCI A/D in the third to sixth nibbles. Similarly, HMC1, HMC2, HTC1, HTC2, PMC1, PMC2, PTC1, and PTC2 each contain either PCI or non-PCI control information, such as CPU control signals, GPIO control signals, north bridge signals, etc., in all six nibbles, first nibble to sixth nibble. The reserved data packet types can be used to support non-PCI bus transactions, e.g., USB transactions. The NOOP data packet type indicates that there is no new information being transferred on the XPBus. In a preferred embodiment, the NOOP data packet type is transmitted when the control bits do not change from one clock cycle to the next. When the control bits change between clock cycles, then some data packet type other than NOOP is transmitted on the XPBus.

The bits sent in the first nibble of each data packet indicate the type of that data packet. FIG. 35 is a table showing different types of first nibbles and their corresponding data packet types.

FIG. 36 shows the six nibbles of data packet types HMA1/HMD1 and HMA2/HMD2 sent on lines PD0 to PD3 from the HIC to the PIC. In a preferred embodiment, the XPBus PCI master data packets occur in pairs as HMA1 and HMA2 or HMD1 and HMD2. The XPBus PCI master data packet is identified with the bits sent on lines PD2 and PD3 of the 1st control/ID nibble. The XPBus PCI master data packet definition is the same for HIC to PIC and PIC to HIC transfers. The first nibble in HMA1/HMD1 includes FRAME#, IRDY#, 0 (signifying a first address/data segment), and 0 or 1 (where 0 signifies PCI and 1 signifies some other bus), which are sent on lines PD0, PD1, PD2, and PD3, respectively. The second nibble in HMA1/HMD1 includes C/BE0#, C/BE1#, C/BE2#, and C/BE3#, which are sent on lines PD0, PD1, PD2, and PD3, respectively. The third nibble in HMA1/HMD1 includes A/D0, A/D8, A/D16, and A/D24, which are sent on lines PD0, PD1, PD2, and PD3, respectively. The fourth nibble in HMA1/HMD1 includes A/D1, A/D9, A/D17, and A/D25, which are sent on lines PD0, PD1, PD2, and PD3, respectively. The fifth nibble in HMA1/HMD1 includes A/D2, A/D10, A/D18, and A/D26, which are sent on lines PD0, PD1, PD2, and PD3, respectively. The sixth nibble in HMA1/HMD1 includes A/D3, A/D11, A/D19, and A/D27, which are sent on lines PD0, PD1, PD2, and PD3, respectively. Similarly, the first nibble in HMA2/HMD2 includes PAR(PCI), LOCK#, 1 (signifying a second address/data segment), and 0 or 1 (where a 0 signifies PCI and 1 signifies some other bus), which are sent on lines PD0, PD1, PD2, and PD3, respectively. The second nibble in HMA2/HMD2 includes GNT#, a first reserved bit, a second reserved bit, and Cntl PAR (XIS), which are sent on lines PD0, PD1, PD2, and PD3, respectively. The third nibble in HMA2/HMD2 includes A/D4, A/D12, A/D20, and A/D28, which are sent on lines PD0, PD1, PD2, and PD3, respectively. The fourth nibble in HMA2/HMD2 includes A/D5, A/D13, A/D21, and A/D29, which are sent on lines PD0, PD1, PD2, and PD3, respectively. The fifth nibble in HMA2/HMD2 includes A/D6, A/D14, A/D22, and A/D30, which are sent on lines PD0, PD1, PD2, and PD3, respectively. The sixth nibble in HMA2/HMD2 includes A/D7, A/D15, A/D23, and A/D 31, which are sent on lines PD0, PD1, PD2, and PD3, respectively.

FIG. 37 is a table that shows the six nibbles of data packet types PMA1/PMD1 and PMA2/PMD2 sent on lines PD0 to PD3 from the PIC to the HIC. In response to receiving the data packet types shown in FIG. 37 from a master, the target has to send back a read data packet to the master. FIG. 38 is a table showing a PCI target read data packet for both HIC to PIC and PIC to HIC and includes the six nibbles for data packet types HTD1/PTD1 and HTD2/PTD2.

FIG. 39 is a table that shows an example of a PCI read data packet transaction with the HIC as master and the PIC as target. FIG. 40 is a table that shows an example of a PCI write data packet transaction with the HIC as master and the PIC as target.

After a PCI master data packet is sent from the HIC to the PIC, only one of two control packets needs to be sent from the PIC to the HIC as a PCI target response. If any control bit within the control packet has changed, then the control packet must be sent. If no control bit within the control packet has changed, the default data packet to be sent will alternate between the first control segment and the second control segment. FIG. 41 is a table that shows PCI target control data packets sent from the PIC to the HIC on the XPBus with PCI response. FIG. 42 is a table that shows PCI target control data packets sent from the PIC to the HIC on the XPBus without PCI response. In FIGS. 41 and 42, ID (PTC1) and ID (PTC2) indicate a first target control segment and a second target control segment, respectively.

Similarly, after a PCI target data packet is sent from the HIC to the PIC, only one of two control packets needs to be sent from the PIC to the HIC as a PCI master response. If any control bit within the control packet has changed, then the control packet must be sent. If no control bit within the control packet has changed, then the default data packet to be sent will be the first control segment. FIG. 43 is a table that shows PCI master control data packets sent from the PIC to the HIC on the XPBus with PCI response. FIG. 44 is a table that shows PCI master control data packets sent from the PIC to the HIC on the XPBus without PCI response. In FIGS. 43 and 44, ID (PMC1) and ID (PMC2) indicate a first master control segment and a second master control segment, respectively.

FIGS. 45 and 46 are tables that show the HIC to PIC target control data packet and master control data packet, respectively.

FIG. 47 is a table showing the names, types, number of pins dedicated to, and the description of the primary bus PCI signals. The pins represent those between the host PCI bus and the HIC. FIG. 48 is a table showing the names, types, number of pins dedicated to, and the description of the XPBus signals. The pins in this case are those between the HIC and the PIC. FIGS. 49 and 50 are tables showing the names, types, number of pins dedicated to, and the description of the XIS bus video port signals and the video port signals, respectively. The pins for the XIS bus video port signals are features that are optionally supported between the HIC and the PIC whereby the video port signals are bridged between the peripheral console and the ACM. FIG. 51 is a table showing the names, types, number of pins dedicated to, and the description of the flash memory interface signals. There are pins for the flash memory interface between the flash memory unit for the HIC and the HIC as well as some between the flash memory unit for the PIC and the PIC. FIG. 52 is a table showing the names, types, number of pins dedicated to, and the description of the test port Joint Test Access Group (JTAG) signals. JTAG is herein used as a shorthand for the IEEE JTAG/1149.1 Standard. The JTAG pins are connected to devices which support JTAG, e.g., the CPU, to test those devices during the process of manufacturing a system comprising such devices. As the JTAG pins are used only for testing during the manufacturing process, they are not shown in the other figures that deal with post testing situations. FIG. 53 is a table showing the names, types, number of pins dedicated to, and the description of the CPU signals. The CPU signal pins are between the CPU and the HIC. FIG. 54 is a table showing the names, types, number of pins dedicated to, and the description of the north bridge signals. The north bridge signal pins are between the north bridge and the HIC. FIG. 55 is a table showing the names, types, number of pins dedicated to, and the description of the GPIO signals. The GPIO signal pins are between the GPIO and the HIC. FIG. 56 is a table showing the names, types, number of pins dedicated to, and the description of the error/reset signals. The pins for the error/reset signals are between the HIC and the PIC and are part of the XPBus. They are shown separately from the XPBus signals shown in FIG. 48 because they serve a considerably different purpose than those in FIG. 48. FIG. 57 is a table showing the names, types, number of pins dedicated to, and the description of the power/ground/oscillator input signals. The pin for OSCin is between a reference clock and the PLL. The pins GND(PLL) and VCC(PLL) are for the phase lock loop. The pins VCC (core) and GND(core) are for the core circuitry of the HIC. The pins VCC(LVDS) and GND(LVDS) are for the LVDS lines (PD0 to PD3, PCN, PDR0 to PDR3, and PCNR lines). The pin VCC(VP) is for the video port. The pins VCC(PCI) and GND(PCI) are for the PCI lines. The pins VCC(flash) and GND(flash) are for the flash memories. It is to be noted that the video port does not have a dedicated ground pin. The video port may share a ground pin with other devices to reduce the number of pins used. For example, it may share GND(flash) with the flash memories. The PCI lines and flash memories are driven by devices that source current from VCC(PCI) and VCC(flash), respectively, and which sink current to GND(PCI) and GND(flash), respectively.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

I claim:

1. A modular computer system comprising:
    a peripheral console including a power supply, a programmable memory containing configuration information, and a peripheral component interface;
    a computer module including a central processing unit and a main memory;
    a power bus between the computer module and the peripheral console, the power bus configured such that the central processing unit receives power only when the computer module is attached to the peripheral console; and
    a differential signal channel between the computer module and the peripheral console, the differential signal channel configured to communicate an encoded bit stream comprising PCI bus transaction data bits, system control signal data bits, and peripheral console configuration information data bits, the transaction data bits, system control signal data bits, and peripheral console configuration information data bits separated within the encoded bit stream.

2. The modular computer system of claim 1 wherein the computer module further comprises a graphics controller and the peripheral console is configured to receive video capture data from a video source, the modular computer system further comprising a second differential signal channel between the computer module and the peripheral console, the differential channel configured to encode the bit stream to communicate the video capture data to the graphics controller.

3. The modular computer system of claim 1 wherein:
    the computer module further comprises a graphics controller; and
    the computer module is configured to communicate a video display signal from the graphics controller to a display coupled with the peripheral console.

4. The modular computer system of claim 1 further comprising a video bus configured to communicate mixed encoded RGB analog video display signals, digital video display signals, and television display signals from the computer module to the peripheral console.

5. The modular computer system of claim 4 wherein the digital video display signal comprises a transition minimized differential signaling (TMDS) signal.

6. The modular computer system of claim 4 wherein the video bus is configured to communicate the video capture signal to the graphics controller.

7. The modular computer system of claim 1 wherein the power bus is configured to communicate a power of 3.3V to the computer module.

8. The modular computer system of claim 1 wherein the power bus is configured to communicate a power of 5V to the computer module.

9. The modular computer system of claim 1 wherein the differential signal channel comprises at least two pairs of differential signal lines.

10. The modular computer system of claim 9 wherein a first pair of differential signal lines is configured to communicate a clock signal and a second pair of differential signal lines is configured to communicate a data signal.

11. The modular computer system of claim 10 wherein the first pair of differential signals is configured to communicate the clock signal at a minimum clock speed of 50 Mhz.

12. The modular computer system of claim 9 wherein the differential communication channel comprises an LVDS channel.

13. The modular computer system of claim 12 wherein the differential communication channel comprises IEEE 1394 lines.

14. The modular computer system of claim 1 wherein the computer module further comprises a first PCI bus in electrical communication with the differential signal channel through a first interface controller.

15. The modular computer system of claim 14 wherein the peripheral component interface of the peripheral console comprises a second PCI bus in electrical communication with the differential signal channel through a second interface controller, the first interface controller and the second interface controller operating in conjunction to bridge the first PCI bus to the second PCI bus.

* * * * *